(12) United States Patent
Jitaru et al.

(10) Patent No.: US 10,186,955 B2
(45) Date of Patent: Jan. 22, 2019

(54) IDEAL SWITCH BRIDGELESS PFC

(71) Applicant: ROMPOWER ENERGY SYSTEMS, INC., Tucson, AZ (US)

(72) Inventors: Ionel Jitaru, Tucson, AZ (US); Marco Antonio Davila, Marana, AZ (US); Cosmin Andrei Tamas, Bucharest (RO)

(73) Assignee: ROMPOWER TECHNOLOGY HOLDINGS, LLC, Milford, DE (US)

( * ) Notice: Subject to any disclaimer, the term of this patent is extended or adjusted under 35 U.S.C. 154(b) by 24 days.

(21) Appl. No.: 15/284,207

(22) Filed: Oct. 3, 2016

(65) Prior Publication Data

US 2017/0214314 A1 Jul. 27, 2017

Related U.S. Application Data

(60) Provisional application No. 62/236,887, filed on Oct. 3, 2015.

(51) Int. Cl.
*H02M 1/42* (2007.01)

(52) U.S. Cl.
CPC ....... *H02M 1/4208* (2013.01); *H02M 1/4225* (2013.01); *Y02B 70/126* (2013.01); *Y02B 70/1483* (2013.01)

(58) Field of Classification Search
CPC .............................. H02M 1/4208; H02M 7/06
See application file for complete search history.

(56) References Cited

U.S. PATENT DOCUMENTS

2015/0131343 A1* 5/2015 Hufnagel ................ H02M 1/42
363/49

* cited by examiner

*Primary Examiner* — Adolf Berhane
*Assistant Examiner* — Afework Demisse
(74) *Attorney, Agent, or Firm* — Yakov S. Sidorin; Quarles & Brady LLP

(57) ABSTRACT

Ideal switch bridgeless PFC topologies are presented with the purpose of increasing the efficiency in power factor correction circuits and inverter applications. The topology also leverages the new GaN switches that are available. This patent offers also a very good solution for the Zero crossing distortion problem improving greatly the THD both in power factor correction and inverter applications.

12 Claims, 28 Drawing Sheets

Ideal Switch Bridgeless PFC Realized with Semiconductor Components For Each Switch FIGURE 1: Prior Art FIGURE 2: Prior Art Ideal Switch Bridgeless PFC Realized with Auxiliary Steering Inductor, MOSFET Switches, and Silicon Carbide Schottky Diodes

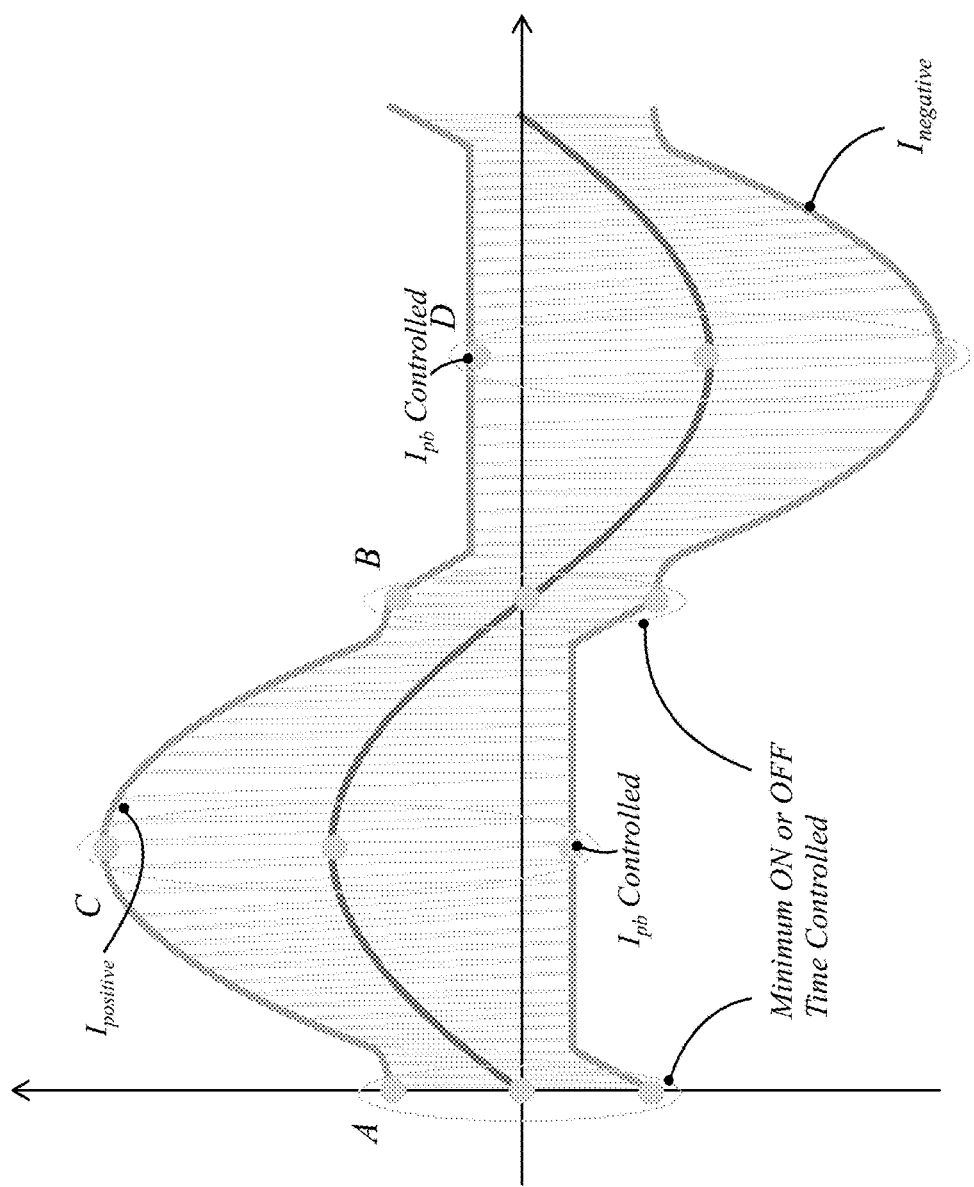
FIGURE 7: Critical/Boundary Mode Operation

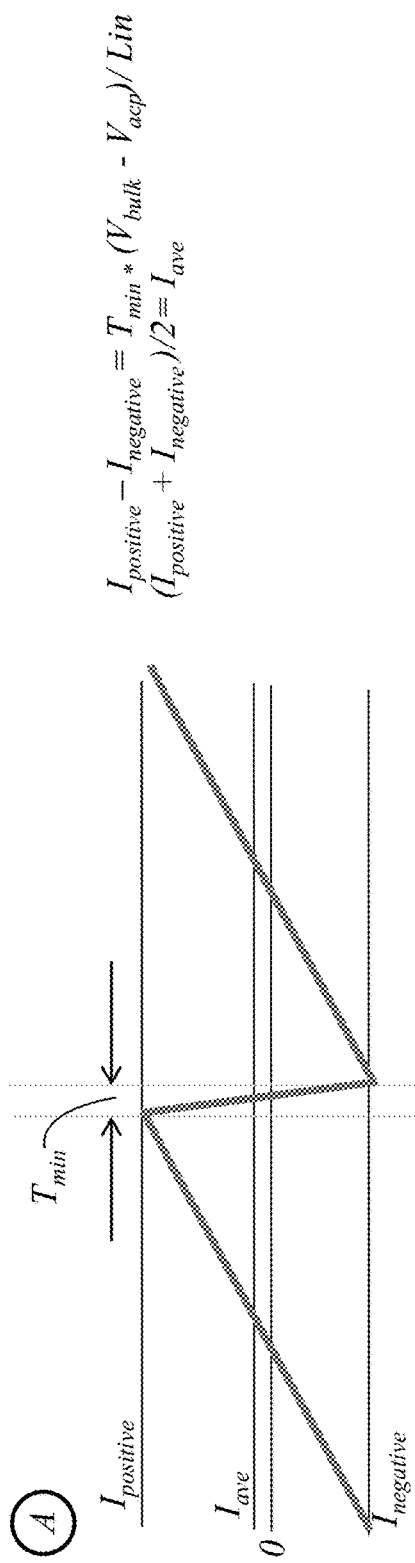
FIGURE 8: $T_{minimum}$ Controlled Positive Current
$$I_{positive} - I_{negative} = T_{min} * (V_{bulk} - V_{acp})/L_{in}$$
$$(I_{positive} + I_{negative})/2 = I_{ave}$$
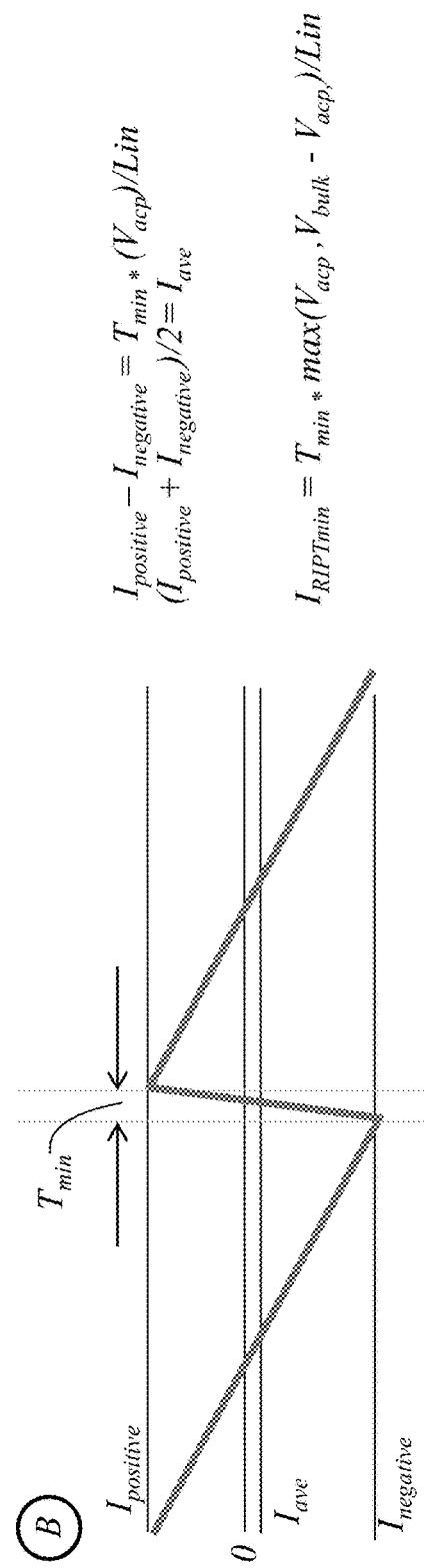
FIGURE 9: $T_{minimum}$ Controlled Negative Current
$$I_{positive} - I_{negative} = T_{min} * (V_{acp})/L_{in}$$
$$(I_{positive} + I_{negative})/2 = I_{ave}$$
$$I_{RIPTmin} = T_{min} * max(V_{acp}, V_{bulk} - V_{acp})/L_{in}$$

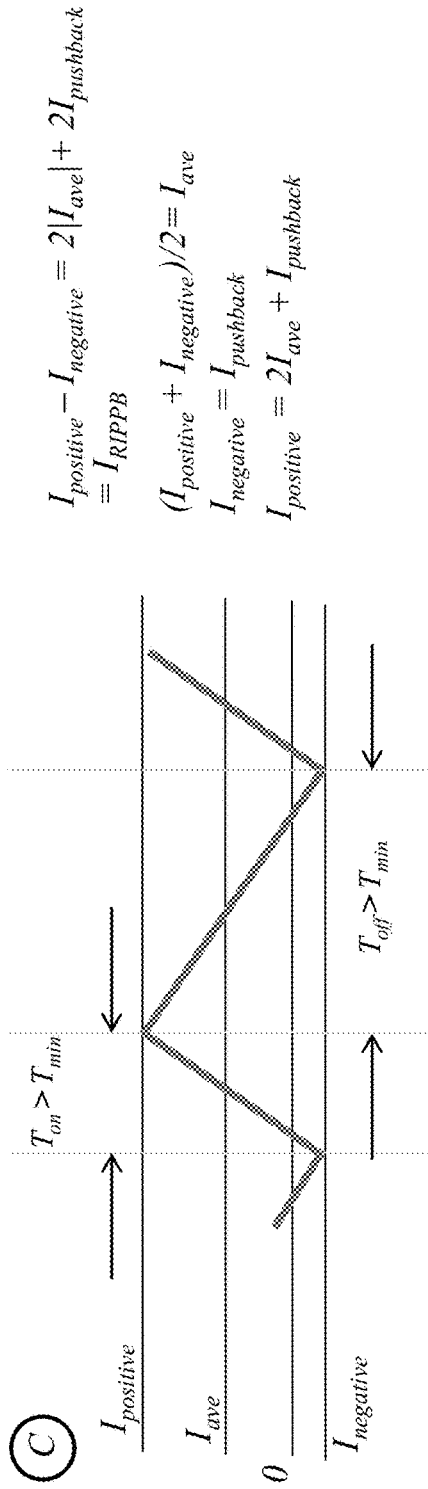
FIGURE 10: $I_{pushback}$ Controlled Positive Current
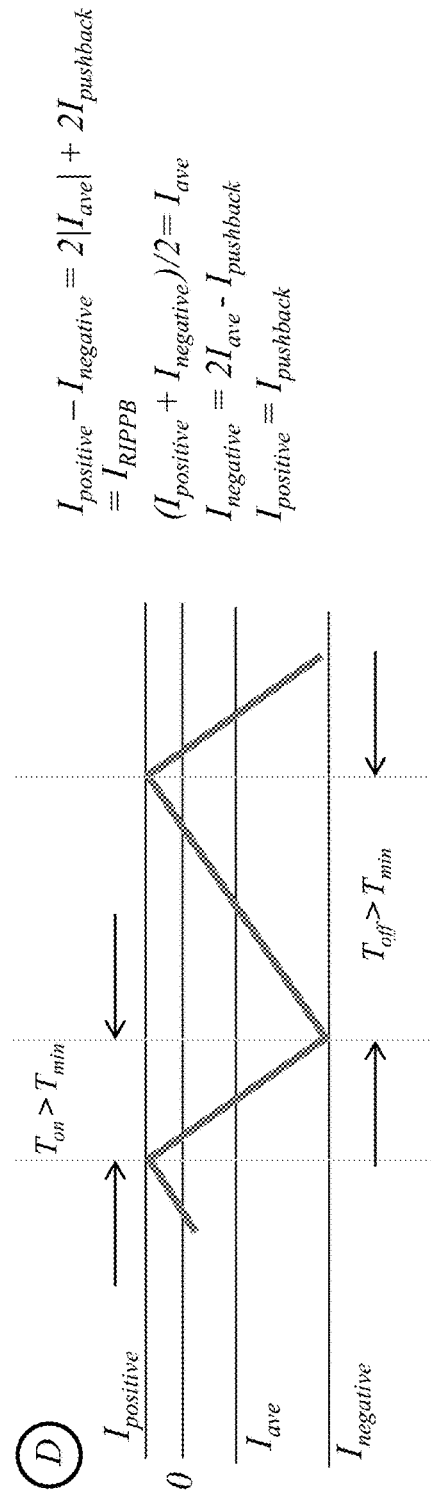
FIGURE 11: $I_{pushback}$ Controlled Negative Current

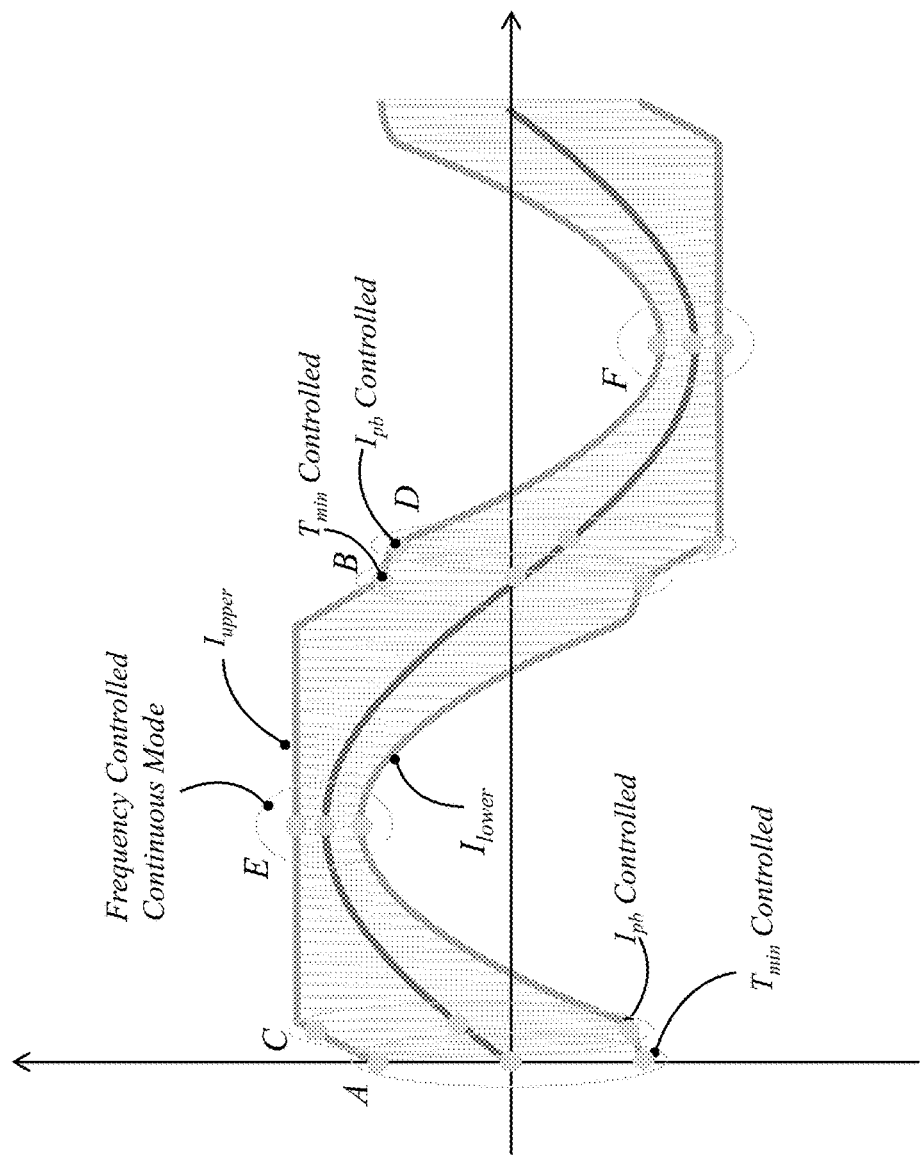
FIGURE 12: Continuous Conduction Mode Current Thresholds

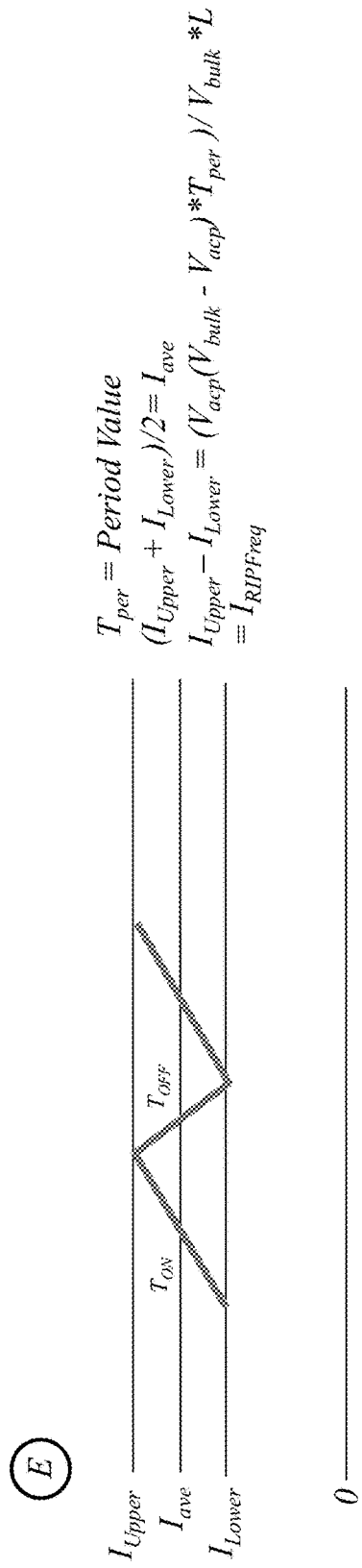
FIGURE 13: Positive Current Continuous Conduction Frequency Controlled
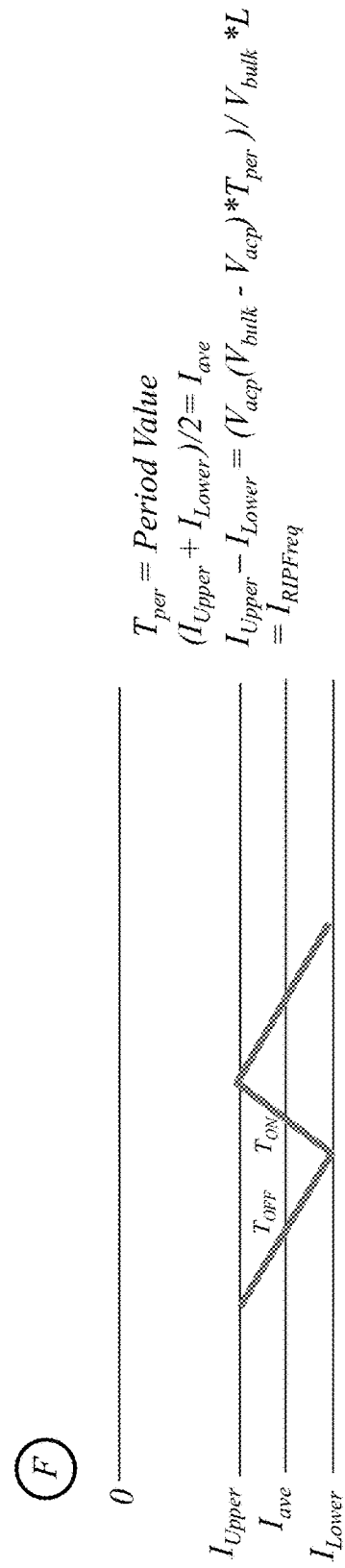
FIGURE 14: Negative Current Continuous Conduction Frequency Controlled

*Combining:*

$I_{ripple} = I_{Upper} - I_{Lower} = max(I_{RIPTmin}, min(I_{RIPPB}, I_{RIPFreq}))$ ; for PFC that allows Continuous Conduction $I_{ripple} = I_{positive} - I_{negative} = max(I_{RIPTmin}, I_{RIPPB})$ ; for Critical Mode/Zero Crossing Current Controlled PFC $I_{Upper} = I_{ave} + I_{ripple}/2$ ; for Both Modes with $I_{Upper}$ and $I_{positive}$ being the same
$I_{Lower} = I_{ave} - I_{ripple}/2$ ; for Both Modes with $I_{Lower}$ and $I_{negative}$ being the same

FIGURE 15:

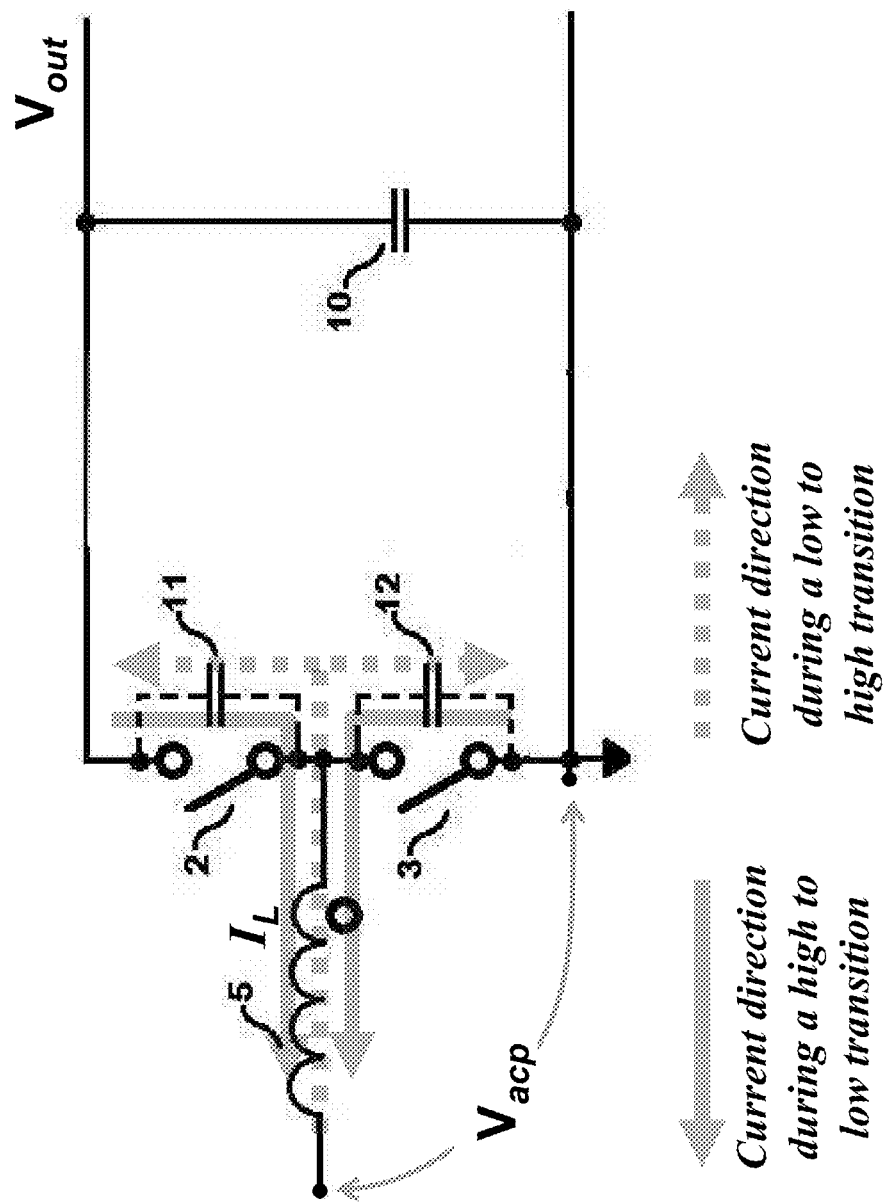

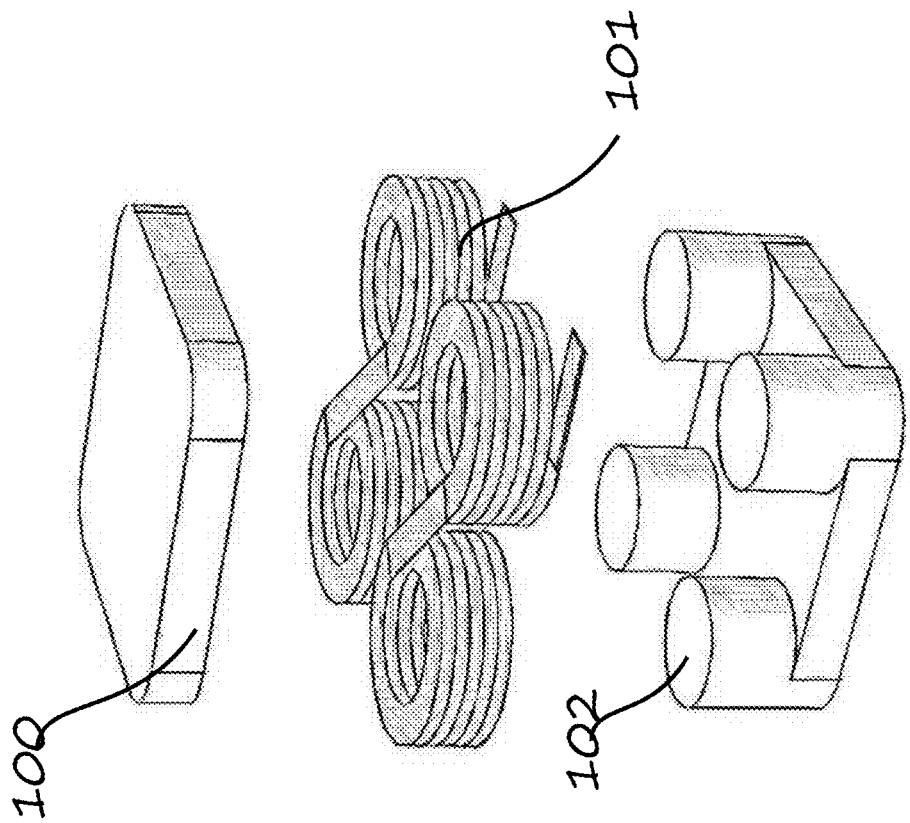
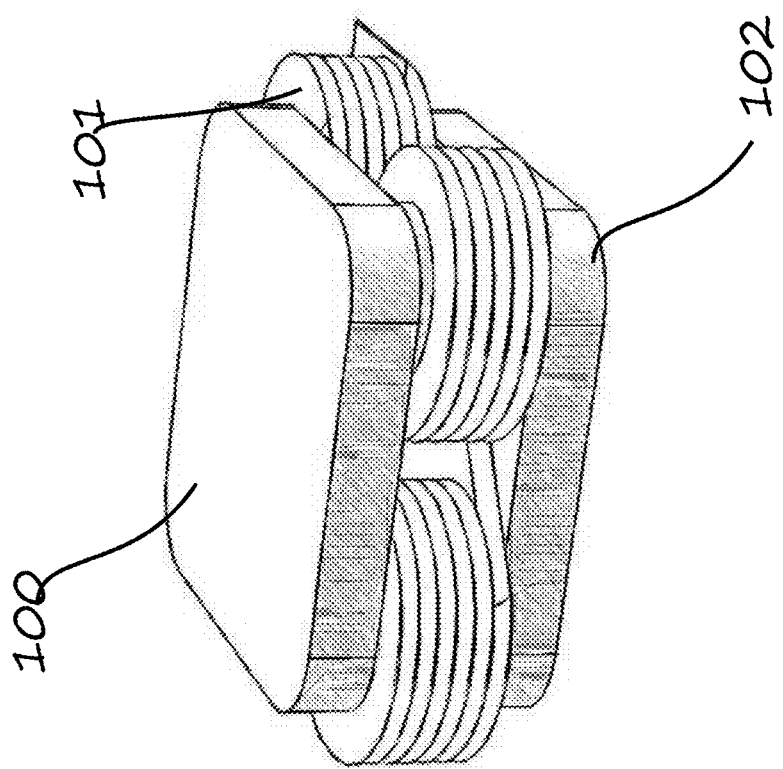
FIGURE 17:

FIGURE 24: Dual Totem Pole Stage that controls both Phase and Neutral. Can be used for Inverter or PFC operation 180° Signal Creation Circuit

US 10,186,955 B2

IDEAL SWITCH BRIDGELESS PFC

RELATED APPLICATION/CLAIM OF PRIORITY

This application is related to and claims priority from U.S. provisional application Ser. No. 62/236,887, filed Oct. 3, 2015, and which provisional application is incorporated by reference herein.

INTRODUCTION

Efficiency is one of the most important parameters in power supplies. In typical power factor correction boost topologies the input AC voltage is first rectified then processed by a boost converter. Since the boost also has a rectification function there are topologies that take advantage of this so that a portion of the input bridge is replaced by the existing boost converter. This normally saves a bridge diode drop increasing the efficiency of the converter. Topologies where a portion of the input AC bridge is replaced by the boost converter are called bridgeless PFC's. There are difficulties with all of them. Presented in this paper is one combination that when ideal switches similar to GaN are introduced, will eliminate the majority of the problems associated with bridgeless PFC's. Other modifications that do not involve ideal switches are shown.

To compare bridgeless PFC topologies this paper shows the drops during an "ON cycle" and drops during an "Off cycle". Since we are dealing with equivalent components, there are 3 types of drops. First type is the low frequency diode drop that is part of the bridge. Second type is switch drop, which is normally a MOSFET. Third type is a high frequency diode drop typically represented by a silicon carbide diode. The typical preference is the same order. For example a low frequency diode drop is typically lower drop than a MOSFET drop which is lower than a silicon carbide diode drop. This is somewhat dependent on the number of MOSFET devices since MOSFET devices are resistive so paralleling more switches reduces the drops. But for comparisons and cost each PFC will be evaluated on each type of drops that are associated with it.

Some bridgeless PFC configurations affect the common mode noise. This application discards those topologies that produce forced high frequency common mode noise. Any topology that connects the phase or neutral to different internal voltages during one switch cycle is discarded. The switching must occur on the side that is non-phase or non-neutral of PFC boost inductor so that the phase or neutral remains steady (at least at the switching frequency) compared to the common of the output of the PFC stage.

This patent application presents several ways of achieving ideal switch behavior in bridgeless PFC circuits and presents control methods for the PFC current in the boost inductor.

PRIOR ART CIRCUITS

Shown in FIG. 1, is a bridgeless PFC topology that replaces both bottom low frequency diodes of the bridge with switches and replaces the top low frequency diodes with high frequency diodes. Shown in this figure is input AC voltage source (2) with phase connection as (1)(also referred as Vacp in this document) and neutral connection as (11) (also referred as Vacn in this document), input filtering capacitors (3,10), high frequency diodes (5,8), input chokes (4,9), output capacitor (12), MOSFETs (6,7) as switches, and output voltage (13,14). In order for reduced common mode switching two inductors (4) and (9) are used. To hold the common (13) steady, capacitors (3) and (10) are used on the other side of the chokes. This topology is very good in terms of semiconductor drops. During an "On" in either polarity, it has two switches of drop (both switches (6) and (7) are on). During the off the switch that is connected to the choke on the more positive of the input line (phase or neutral) is turned off. When phase (1) is more positive than neutral (11) switch (6) is turned off. When neutral is more positive than phase switch (7) is turned off. The remaining switch during the off remains on. During the off, the drop is a high frequency diode and the other switch. The switch that is on all the time in one polarity has only the high frequency ripple current. The DC component (low frequency AC component) flows in the inductor in parallel with it. Since both MOSFET switches have their sources connected to common in this topology, they are easy to drive. Even though this topology has excellent characteristics for the switches and diodes, it does have one drawback. It uses two chokes, each of them must be designed magnetically to handle the peak power and ripple. Each choke must be designed to withstand the full volt seconds since each choke is used on different polarities as the main choke while the other choke is bypassed. In addition, both chokes have the line input low frequency current in both polarities. That means that even though only one choke has core losses and ripple in one polarity both chokes have the low frequency AC line current resistive losses. This extra choke adds resistive losses, costs, and extra space.

Shown in FIG. 2, is a bridgeless PFC topology that replaces the left side of the low frequency bridge with high frequency diodes (17) and (18). Only one input choke (16) is needed. An input capacitor on neutral (25), or on phase, or both is used (shown is a capacitor on neutral). The right hand side of bridge uses normal rectifiers (22) and (24). In order to create a boost on, an additional bi-directional switch is used to connect the left side of the bridge to the right. This connects the input line in either polarity energiZing the choke. The bidirectional switch has to be implemented with two conventional one directional switches (19) and (20) (MOSFETS). During the "On" this topology has two switches of drop. During the off, it has a high frequency diode drop and a low frequency diode drop. The input line, when phase is positive compared to neutral, is connected through the lower diode (24) from the common to neutral. In the other polarity, the plus output is connected to neutral with diode (22). This produces only a low frequency common mode movement between it and neutral which is allowed (not in the EMI frequency range). This topology has also excellent semiconductor drops and only uses one choke. The only difficulty would be the driving of the bi-directional switch using a floating drive (21). This has to be carefully done in order to be able to bias the drive circuitry correctly, since normal boost strapping methods will not work. The drive could be at the most positive rail for half the input AC cycle (a longtime).

SUMMARY OF SOME IMPORTANT ASPECTS OF THE PRESENT INVENTION

In a first important aspect of the present invention a totem pole bridgeless PFC is formed by a main inductor element, two main switching devices placed on top of each other with the common part connected to said main inductor element, referred as switching node, one first low frequency rectifier means connected with the cathode to Vout+ and a second low frequency rectifier means connected with the cathode to the anode of said first rectifier means and the anode to to Vout−. Two capacitors connected across each rectifier means wherein the common connection of the low frequency rectifier means is connected to neutral and the termination of the said main inductor element not connected to the switching node is connected to the phase of an AC source.

In a preferred version of this first aspect, a bidirectional current injection circuit is placed into the said switching node, and the current injected in the switching node is shaped as a narrow current pulse with an amplitude larger than the current through the main switching elements prior to the transition time, in order to obtain Zero voltage switch conditions across both main switching devices.

Also, in another preferred version of this first aspect two auxiliary chokes coupled together and placed in between the switching node and each main switching element and two additional rectifiers means with very fast reverse recovery are placed between the main switching elements connection to the auxiliary chokes, one with the cathode to the Vout+ and the other one with anode to Vout−, and the diode with the cathode to Vout+ has the anode to the main switching element connected to the Vout−.

Moreover, in still another preferred version according to this first aspect, a Schottky diode is placed in series with each of the main switching elements in a such way to prevent the conduction of the both diodes of the main switching elements and two additional rectifiers means with very fast reverse recovery are placed between the switching node and one with the cathode to the Vout+ and the other additional diode with the anode to the Vout−.

Additionally, in yet another preferred version of this preferred aspect, a dual level current control method is used for minimum ON time, push back current optimiZation which can be expanded to maximum frequency control for continuous mode. Also, the low frequency side is lifted by using a low power converter. In addition, the low frequency side is lifted by using a flyback converter.

With a circuit according to this first aspect, operating in critical conduction mode, and operating in parallel with one or more circuits according to this first aspect, the interleaving is done through variable frequency by changing the ripple current in each channel.

Moreover, with a circuit according to this first aspect, with the circuit operating in critical conduction mode, and operating in parallel with one or more circuits according to this first aspect, where the interleaving is done by adjusting the desired on time for switchers for expected ripple current for a particular input voltage, output voltage and input current.

According to another important aspect of the present invention, a magnetic element is part of a PFC wherein the windings are formed by a series of windings connected together in series, each winding being placed on a leg of a multiple legs magnetic structure of even number of legs wherein the windings polarity is in a such way that the magnetic field produced by adjunction windings have an opposite polarity.

In a preferred version of this second aspect, the windings are embedded in a multilayer PCB structure.

Also, in another preferred version of this second aspect, the windings are formed by LitZ wire.

In yet another preferred version of this second aspect, the windings are formed by magnetic wire.

In still another preferred version of this second aspect, the windings are formed by LitZ wire and additional windings coupled with said winding formed by LitZ wire, the additional windings being embedded in a multilayer PCB.

According to another preferred version of this second aspect, a multiple legs magnetic structure is reduced to one leg and the gap in this leg is split into multiple gaps by using pieces of magnetic material These and other features of the present invention will be further apparent from the following detailed description and the accompanying drawings.

BRIEF DESCRIPTION OF THE DRAWINGS

FIG. 7 shows Current control for the case of a bridgeless PFC converter operating in boundary or transition mode;

FIGS. 8 and 9 show equations for the minimum ripple;

FIGS. 10 and 11 show equations for Zones (C) and (D) where Ipb is controlled;

FIG. 12 shows how the current control method could be expanded from a boundary mode operation to a continuous mode power factor corrected converter;

FIGS. 13 and 14 show equations for preventing a lower frequency during continuous conduction mode;

FIG. 15 shows combined and simplified equations for all modes;

FIG. 16 shows the initial conditions and the parasitic capacitances (11) and (12) of the half bridge portion of the circuit formed by the two switches (2) and (3) (MOSFETs or GaNs can be used);

FIG. 17 is a 4 legged choke constructed with cores (102) and (100) and winding (101);

DETAILED DESCRIPTION

Ideal Switch Topologies

Figure 1:
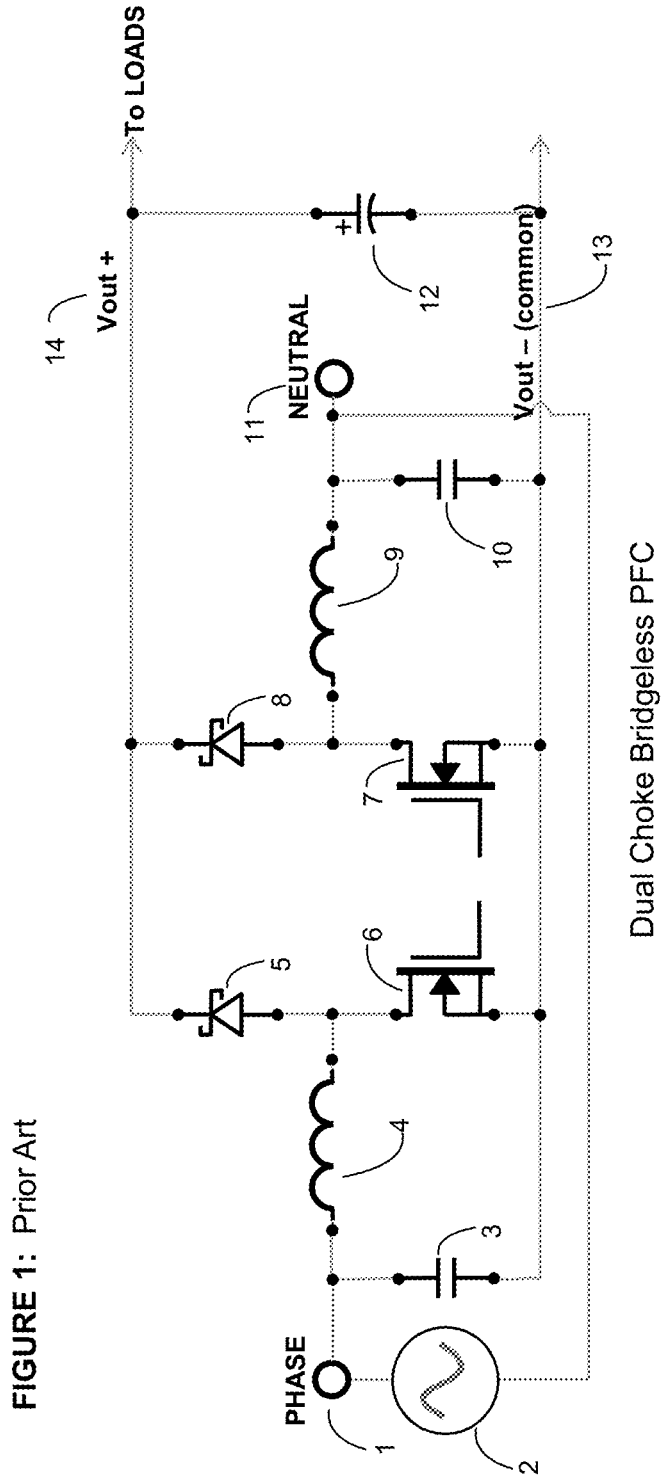
FIG. 1 shows a bridgeless PFC topology that replaces both bottom low frequency diodes of the bridge with switches and replaces the top low frequency diodes with high frequency diodes.
Figure 2:
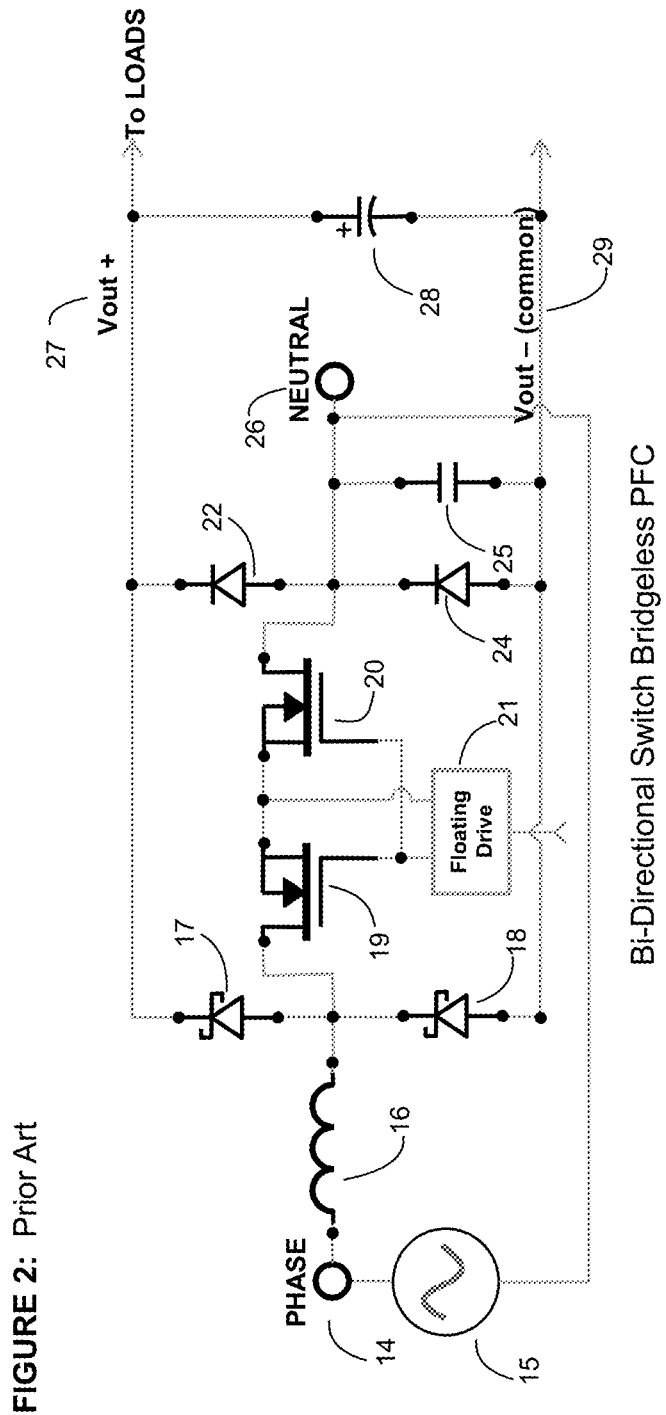
FIG. 2 shows a bridgeless PFC topology that replaces the left side of the low frequency bridge with high frequency diodes (17) and (18)
Figure 3:
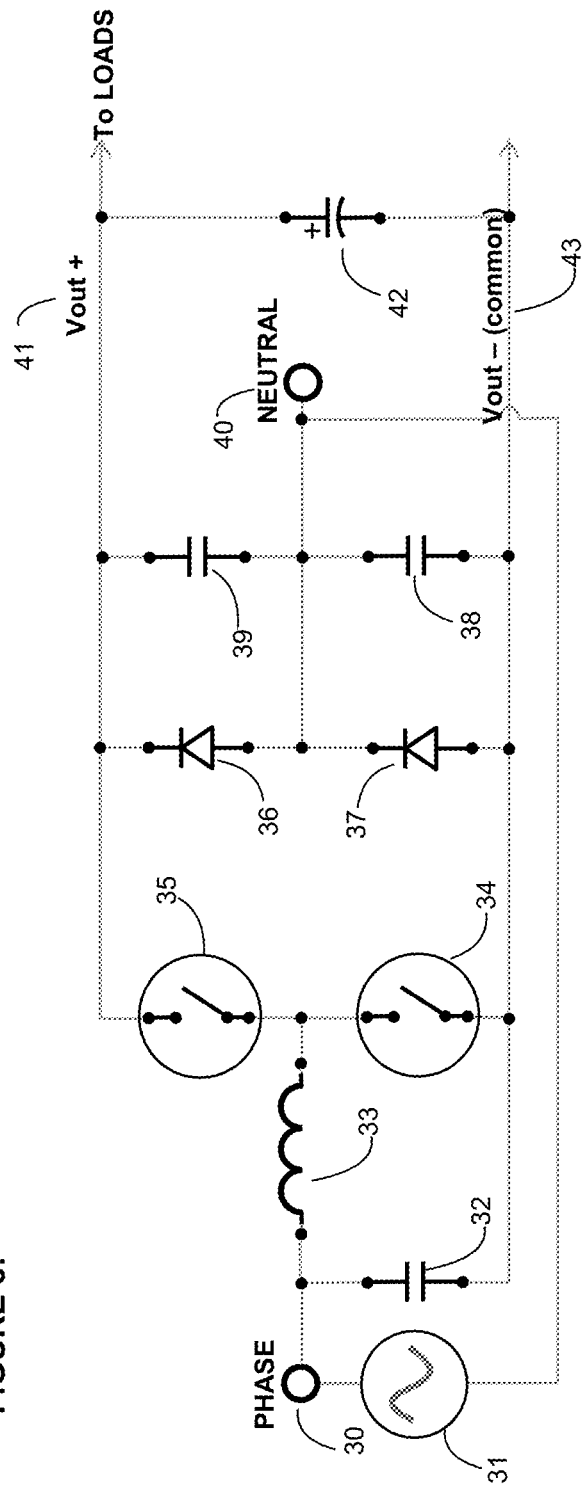
FIG. 3 shows a topology where the left side of the bridge is replaced by switches (34) and (35)
Figure 4:
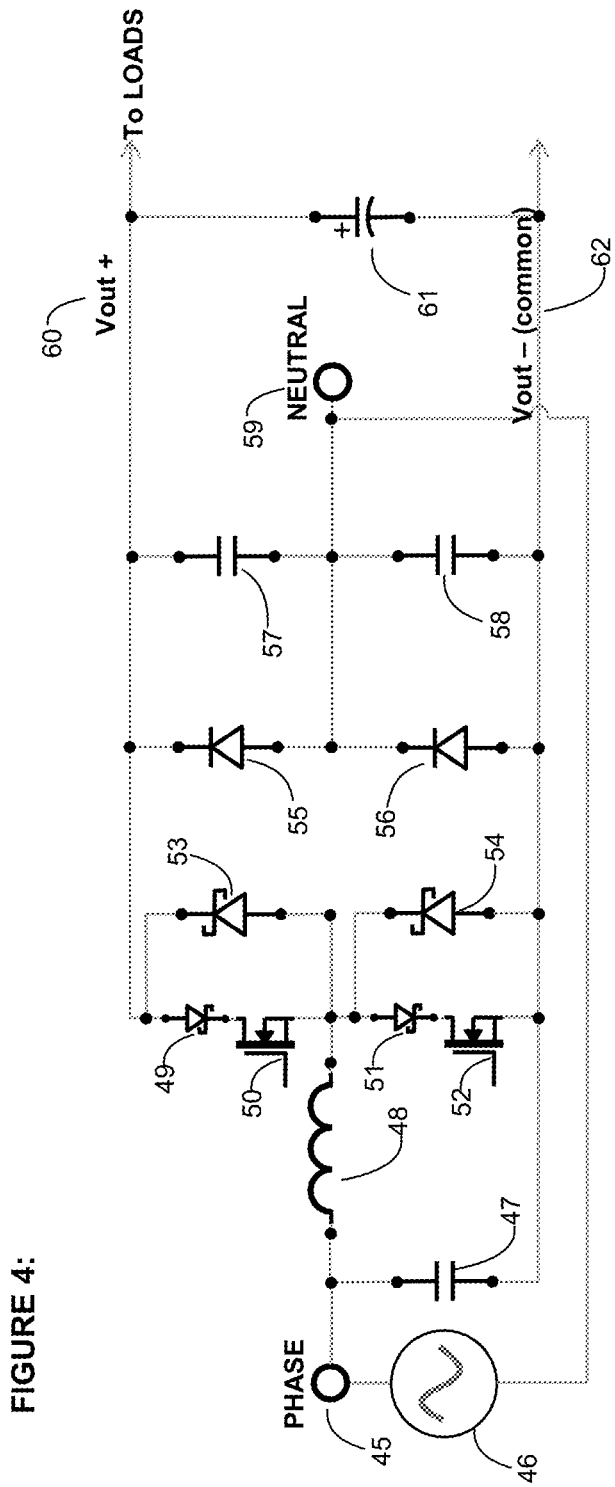
FIG. 4 shows a modification where the top switch (35) and bottom switch (34) are replaced with 3 components each to create the ideal characteristics.

FIG. 3, shows a topology where the left side of the bridge is replaced by switches (34) and (35). The neutral is held steady compared to common on the right side by the use of two capacitors (38) and (39). Capacitor (32) also can be used for this. A capacitor from phase to Vout can also be used (not shown). In this topology the switches must do the work of both boost switch and diode depending on the polarity of the input line. The drop during an on and off will be a switch and a low frequency diode. Unfortunately most modern day switches cannot fulfill both roles at the same time if the converter is run in continuous conduction mode. Reverse recovery losses in the body diode of the switch fulfilling the diode role would overwhelm the efficiency savings. Even though this topology has the best semiconductor drops it must be modified in order to use silicon MOSFETs due to this problem. Shown in FIG. 4, is a modification where the top switch (35) and bottom switch (34) are replaced with 3 components each to create the ideal characteristics. The high speed rectification function is done with silicon carbide Schottky diode (53) on the top switch and diode (54) on the bottom switch. In order to prevent the internal body diodes of MOSFETs (50) and (52) from turning on a low voltage Schottky prevents reverse current flow (diode (49) on the top switch and diode (51) on the bottom switch). In this situation current flowing down is controlled by the MOSFET and current flowing in reverse is controlled by the silicon carbide diode. If these where to be calculated in terms of drops during the on cycle we would have now a Schottky diode drop, a low frequency diode drop, and a MOSFET drop. During the off the drop would be a high frequency diode drop and a low frequency diode drop. Still not a very good trade off.

Figure 5:
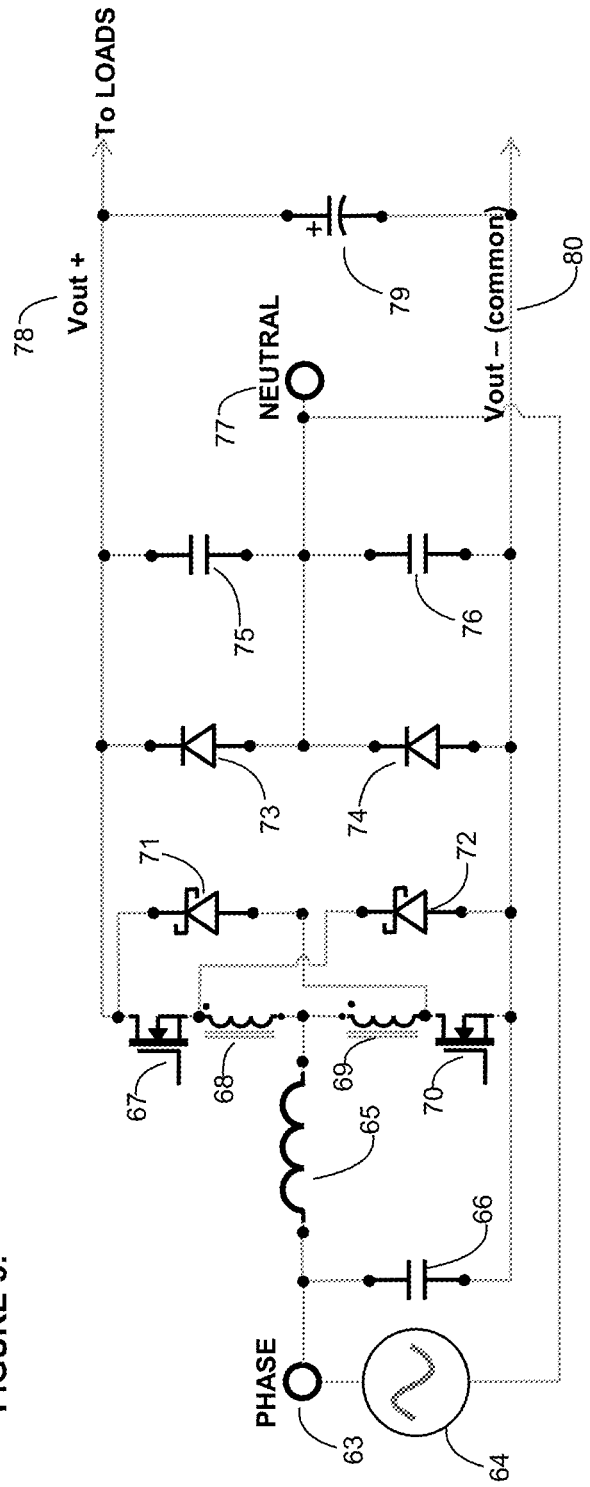
FIG. 5 shows the ideal switch that is realiZed using a magnetic element (68) and (69)

Shown in FIG. 5, the ideal switch is realized using a magnetic element (68) and (69). The Schottky diodes in series with the switches are removed compared to FIG. 4. In this configuration, the switch that is working forms current in the main choke and the auxiliary choke. For example when MOSFET (70) is on the main choke (65) and the auxiliary choke (69) have current that flow through them. When this switch (70) turns off the opposite switch (67) does not receive any current through its body diode due to the fact that both inductors (69) and (68) small inductor keeps the current flowing in the previous circuit. In fact (68) and (69) can be combined into the same core. The figure shows them coupled to each other. Instead the current flows into the silicon carbide diode (71). The same thing occurs in the opposite polarity when the working switch is (67) with its diode partner (72). This small auxiliary inductive element (68) and (69) prevents reverse recovery loss in the opposite switch by preventing current flowing in the body diode. The auxiliary inductor value has to be large enough that the voltage divider formed by the main choke and the auxiliary inductor has a voltage drop larger than the drop difference between the silicon carbide diode and the body diode of the opposite switch. It is possible to replace the magnetic core of the small inductor with a saturable reactor to reduce the current flowing through the body diode even further and create a volt-second buffer between them. This also prevents or minimizes parasitic capacitance ringing between the two switches.

Figure 6:
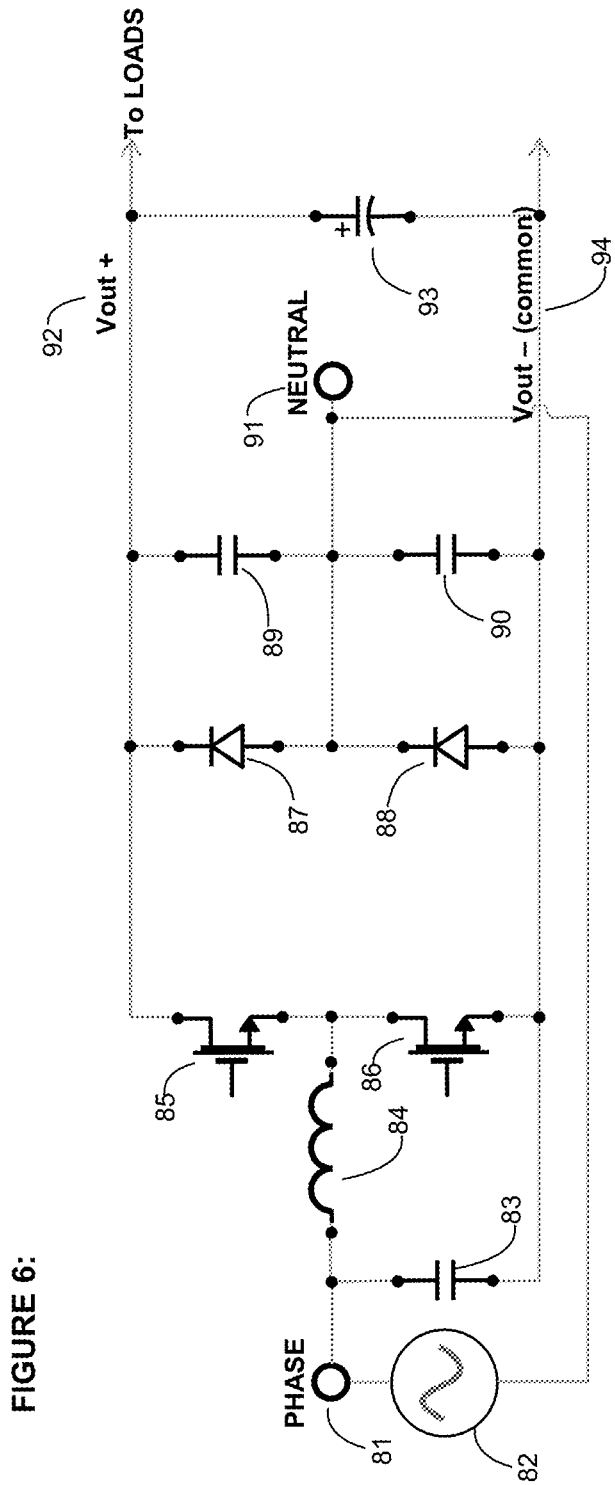
FIG. 6 shows an embodiment with GaN switches (85) and (86) fulfilling both roles as switch and diode.

There is an alternative to these circuits. If the new enhancement mode or cascode gallium nitride switches are used they can fulfill both the switch and fast diode roles. This is shown in FIG. 6 with GaN switches (85) and (86) fulfilling both roles as switch and diode. In the case of an enhancement mode GaN, the drop during the on and off portion would be a gallium nitride switch drop and a low frequency diode. If a cascode depletion mode GaN is used, the drop during the "On" would be GaN die followed by the low voltage silicon MOSFET and a low frequency diode drop. The drop during the "Off" would be the body diode of low voltage MOSFET and the low frequency diode. This ideal switch can now be realized with these new components and this topology takes advantage of this new fact.

Control for Bridgeless PFC Converters

Current control for the case of a bridgeless PFC converter operating in boundary or transition mode is show in FIG. 7. To be more exact, the mode shown is not boundary where the lower current threshold would be Zero, in this case the current reverses beyond the boundary mode threshold. This paper still refers to this operation as boundary mode for simplicity (also called transition mode or critical conduction mode).

In this case the switches in FIG. 6 can be replaced back with MOSFETs. See patent application "Bridgeless PFC using single sided High Frequency Switching", U.S. application Ser. No. 14/535,000, which application is incorporated by reference herein). This current control method allows the use of normal MOSFETs for both roles since the current is not flowing in the body diode of each switch at the moment of turn off. The bottom switch ramps up the current and the top switch ramps down the current during the time phase is positive compared to neutral, shown during section (C); the positive current threshold is larger than the negative current threshold. The bottom switch turns off at the peak of positive current and has a very fast ZVS transition to the top switch. The top switch stays on until the current reverses and becomes slightly negative. The amount of negative current is dependent on the amount needed for desired ZVS or near ZVS condition. The roles of the MOSFETs reverse during the time that the AC line is negative during section D.

The currents in the MOSFETS are controlled using a dual current control. Both the top and bottom currents control when the switches turns off. When the current in the choke hits the upper current threshold the bottom MOSFET is turned off and after a delay for the transition to happen the top switch is turned on. When the bottom current threshold is reached the controller turns off the top MOSFET and after a delay for the transition to happen the bottom switch is turned on. This type of control is dual current mode control and has some advantages. No slope compensation is needed. Current is controlled at turn off of each MOSFET so reverse recovery can be guaranteed to not occur. It is immune to large voltage changes on the neutral side of the converter so a large voltage swing during Zero crossing of the input line still keeps the current in control.

In boundary mode operation the current ripple is at least twice the average current. Shown in FIG. 7 are the current waveforms for a PFC working in boundary mode operation. The amount of ripple current during the pushback controlled area is equal to twice the sum of the absolute value of the average current and the push back current. In order to minimiZe the root mean square (RMS) currents in the circuit elements, the minimum pushback current needed should be used. The amount needed is dependent on the amount of voltage swing needed and the input voltage condition at the time of turn off (see FIG. 16). FIG. 16 shows the initial conditions and the parasitic capacitances (11) and (12) of the half bridge portion of the circuit formed by the two switches (2) and (3) (MOSFETs or GaNs can be used). This involves an energy balance equation before and after the transition happens, the amount of initial current in the choke at the moment of turn off influences the transition characteristic. When the high to low transition occurs (top switch turning off) current in the choke is towards Vacp (phase), the amount of energy in the parasitic capacitors of the switches are with one fully charged to Vout (12) and the other (11) is at Zero. Let's say the energy of a parasitic capacitor fully charged to Vout is Ecp and that the energy in the choke (5) follows the classic equation Echk=½·L·Ipb². This is the starting energy. At the end of the transition the current in the choke should be zero and the opposite parasitic capacitor (11) should be charged to the full Vout level so the energy is again Ecp. What is left is the energy delivered or received by the voltage sources Vacp and Vout. Vout delivered the charge of the two series capacitors from holding capacitor (10) which is equal to the charge of one capacitor Qcp. Therefore, Vout delivered energy Evout=Qcp·Vout. The input voltage received twice the charge amount from each of the capacitors. So, the input voltage received Evacp=2·Qcp·Vacp. Putting all the energy together we get Echk=½·L·Ip²=Qcp·(2·Vacp−Vout). This means $$Ip = \sqrt{2 \cdot \frac{Qcp}{L} \cdot (2 \cdot Vacp - Vout)}.$$

If this equation is followed there are times that the energy needed is negative, but keep in mind that the current in the choke cannot be in the opposite direction to prevent reverse recovery on the body diode of the mosfet. At the end of the transition the current in the choke should be Zero and the opposite parasitic capacitor (11) should be charged to the full Vout level so the energy is again Ecp. What is left is the energy delivered or received by the voltage sources Vacp and Vout. Vout delivered the charge of the two series capacitors from holding capacitor (10) which is equal to the charge of one capacitor Qcp. Therefore, Vout delivered energy Evout–Qcp·Vout. The input voltage received twice the charge amount from each of the capacitors. So, the input voltage received Evacp–2·Qcp·Vacp. Putting all the energy together we get $$Echk \frac{1}{2} \cdot L \cdot Ip^2 - Qcp \cdot (2 \cdot Vacp - Vout).$$

This means $$Ip = \sqrt{2 \cdot \frac{Qcp}{L} \cdot (2 \cdot Vacp - Vout)}.$$

If this equation is followed there are times that the energy needed is negative, but keep in mind that the current in the choke cannot be in the opposite direction to prevent reverse recovery on the body diode of the mosfet. For the transition in the opposite direction the signs on Vacp and Vout can be reversed. During those times that the energy needed is negative setting Ipb (push back current threshold) to Zero is acceptable. The controller would then only have to measure the input voltage and output voltage to determine the amount push back current needed. A table could be used to produce this function with the input voltage measured (Vacp) as an index since Vout, Qcp, and L (choke inductance) are constants. FIG. 7 shows a constant Ipb level in areas (C) and (D) but in reality the optimum Ipb level would change according to the equation above based on the input voltage measured on Vacp.

During Zero crossing the amount of ripple current is reduced since the average current needed to produce unity power factor reduces with input voltage. This will produce very fast off times. These fast off time may stress the switching devices by increasing the switching frequency. To prevent this, a minimum time ripple calculation is made. The equation for the minimum ripple is shown in FIGS. 8 and 9. Tmin is the desired minimum time setting for the converter. This implies that the ripple current would be increased beyond the push back current that is needed so that this minimum time is maintained. The purpose of this is to control the switching frequency and narrow off or on times when the input line voltage is low. This control portion of the graph is shown in FIG. 7 during (A) or (B). The average current is still maintained to follow the input line. The equations for Zones (C) and (D) where Ipb is controlled are shown in FIG. 10 and FIG. 11. For the whole switching cycle both the Ipb needed and the Tmin ripple currents are calculated at every point and whichever is larger is used. This creates a smooth transition between Tmin controlled current Zone to Ipb controlled current Zone and is load and line dependent.

If an ideal switch converter is used in continuous conduction mode, the dual current control method can be expanded to include another area in the curve to control currents in the same polarity. By controlling the higher and lower current thresholds slope compensation is not needed and further the minimum frequency can be controlled. The tradeoff between frequency and ripple current can then be made. A low frequency would produce lower switching losses at a price of higher ripple and vice versa. Shown in FIG. 12 is how the current control method could be expanded from a boundary mode operation to a continuous mode power factor corrected converter. In this case the current thresholds are named $I_{Lower}$ and $I_{Upper}$. Equations for preventing a lower frequency during continuous conduction mode are shown in FIGS. 13 and 14 for both polarities of line. Further in FIG. 15, the combined and simplified equations for all modes are shown. The current ripple is calculated first then the two thresholds are calculated based on the average current desired.

ZERO Crossing Distortion Problem and Solution

During Zero crossing of the input line there is a temporary loss of control in the bridgeless totem pole design PFC with only 1 set of high frequency switches. This occurs even with the current control method. This produces current distortion in the input current affecting the total harmonic distortion. The problem can be understood by the following situation. Assume that the AC line is in positive polarity with phase greater than neutral and also assume that the converter has no reactive current component that it is trying to correct. Using FIG. 3, diode (37) is forward biased and Neutral is a clamped to a diode drop below common. As the AC voltage is reduced during part of the back side of the sinewave (a point greater than 90 degrees), the voltage on neutral remains at a diode drop below ground as the voltage on phase starts to fall. When phase reaches Zero the bottom switch will turn on forever since the current threshold is some positive value but there is no voltage to ramp the choke current. In the controller that was used a period limit is reached and the PWM switches off the bottom switch and turns on the top switch. Since now there is voltage across the choke the current ramps in the opposite direction and works normally. But the average current desired is not conserved since the other switch did not reach its intended threshold. In fact on the next cycle the negative current cannot be changed since the voltage is still at Zero. This causes the unit to go into continuous mode and will have switching losses at this point. Eventually the negative current in reverse starts to charge capacitors (38), (39), and (32) lifting neutral above ground and if the phase input is not negative enough it will be a positive voltage above the ground and the converter will regain control. This situation can last some time depending on the load and the amount of capacitance that is attached to both the phase and neutral side. The problem occurs when the neutral line is "stuck" on the bottom rail when the phase voltage is Zero or negative relative to common. The same problem occurs in the opposite polarity when the neutral line is clamped to Vout+ and the phase voltage is equal to or greater than Vout+. If the converter had high frequency switching where the diodes (37) and (36) are shown and if another choke is used, there would be complete control of the neutral line and this problem would not occur. But this solution is costly, since it involves another complete converter to control the neutral voltage relative to common.

Figure 22:
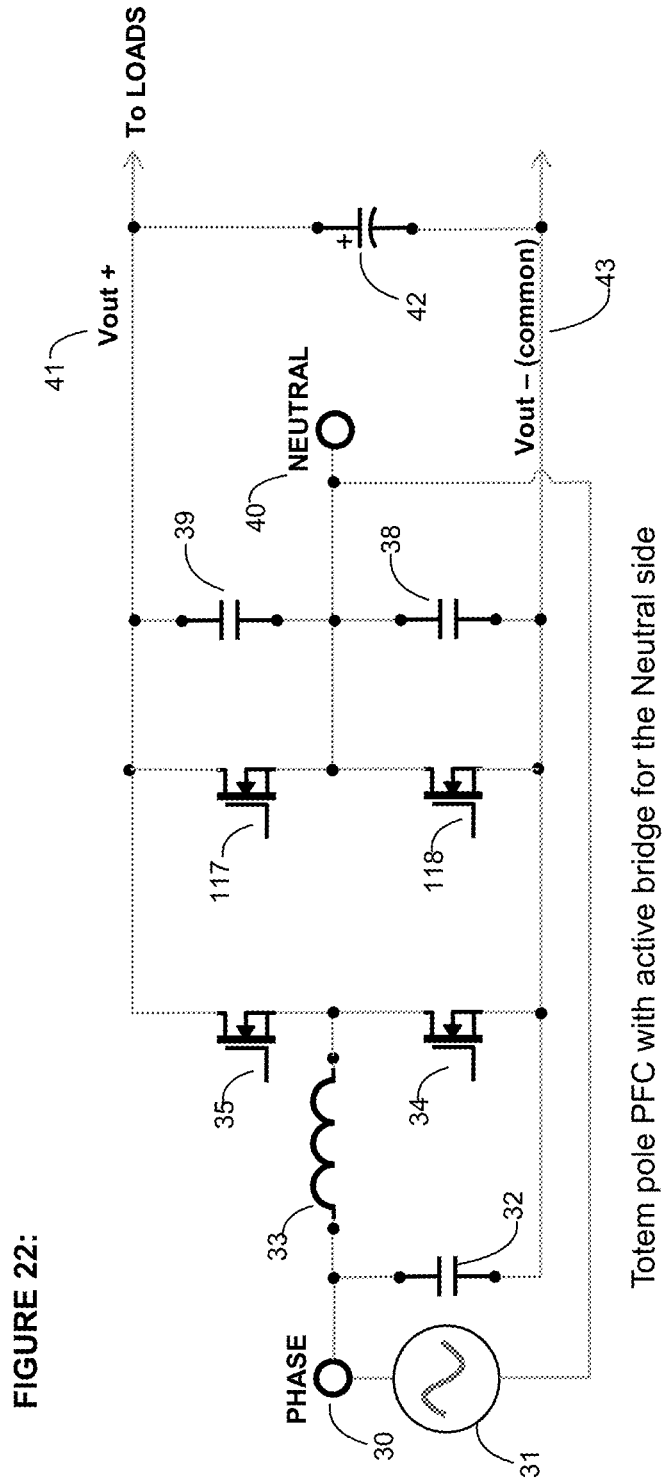
FIG. 22 shows a bridgeless PFC with active switches for the diodes.

FIG. 22 shows a bridgeless PFC with active switches for the diodes. This converter will still have the problem mentioned above unless the switches on the right where used to transition the neutral up or down where the Zero crossing occurs (similar to a class AB amplifier). Unfortunately, even if the transition is smoothly done there is considerable dissipation on these switches due to the capacitance load even if they are switching at a relatively low line frequency of 60 HZ. If the capacitance is reduced and the transition speed increased, dissipation can be reduced but there an EMI and leakage current component introduced in the system and could affect compliance with those specifications. The solution to the problem still is to move neutral to a voltage far enough away from the Vout− or Vout+ so that the phase voltage will be in between Vout− and Vout+ so that the switching side regains control. But how to do this efficiently?

Figure 23:
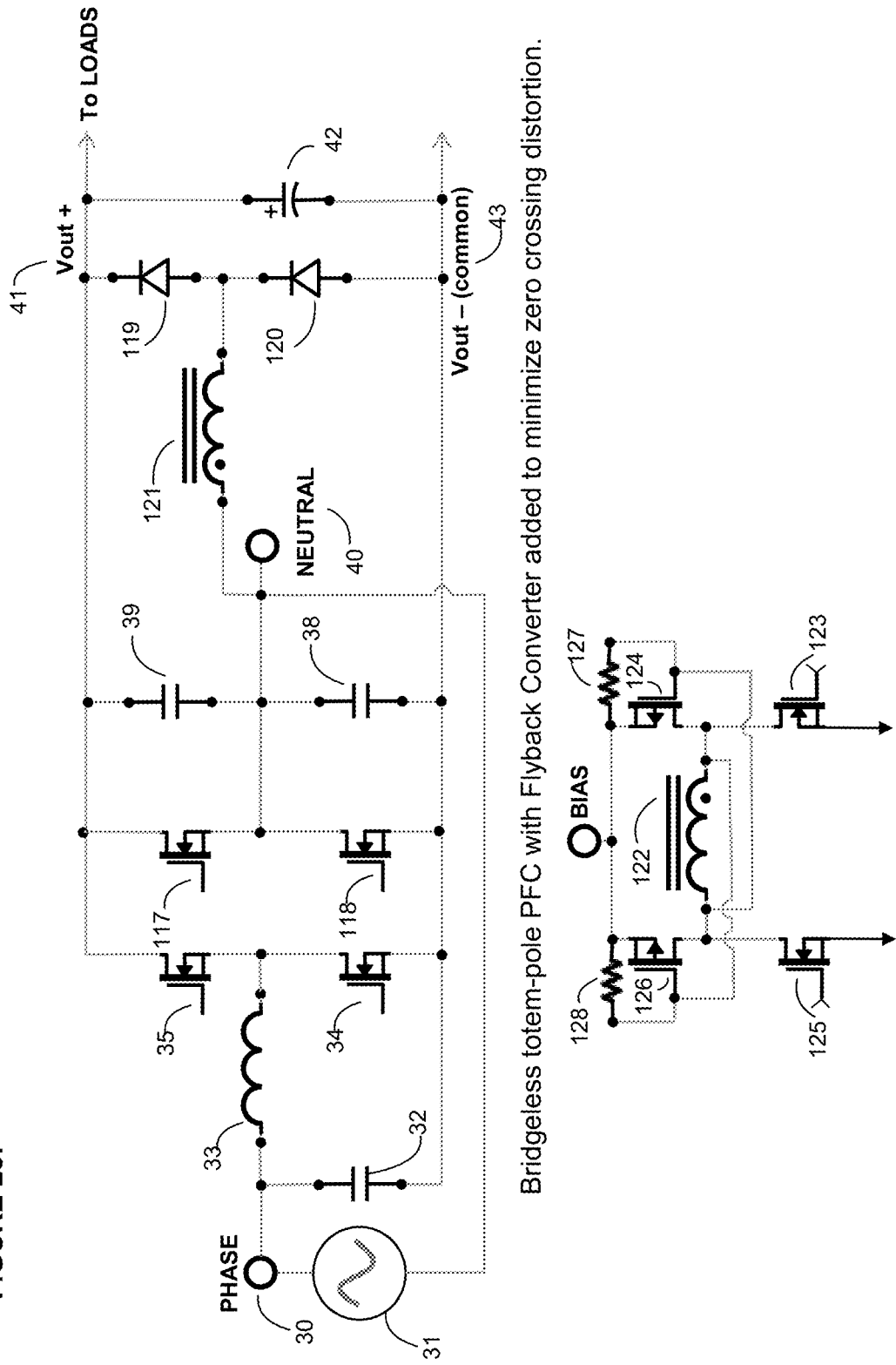
FIG. 23 shows a solution that is very compact and works to separate neutral from the rails (Vout+ and Vout−)

Shown in FIG. 23 is a solution that is very compact and works to separate neutral from the rails (Vout+ and Vout−). Instead of swinging neutral all the way to the opposite rail the flyback converter moves the neutral away enough from the rails to regain control. This is done so that the power required from this small converter is minimiZed. The converter output diodes are setup so that only one of the diodes works depending on which of rails neutral is closest to. If the neutral voltage is far away from both rails, then both diodes (119) and (120) do not forward bias and no current flows. The primary of the converter is setup to be a bidirectional flyback that is self-clamped back into bias. This was done so a single magnetic is used and any excess energy is recycled back into the source. When switch (123) is turned on switch (126) will also turn on putting a voltage across the winding (122). When switch (123) is turned off any excess current will flow through switch (124) and switch (125). If an opposite voltage across the winding is desired switch (125) is turned on instead. Two separate flyback converters can be used instead of the circuit shown which will simplify to one switch on the primary and one diode on the secondary for each flyback, but would require two separate magnetics and will not have clamping.

When the polarity is positive and phase is heading towards Zero, the bottom switch (118) is turned off. Then switching is started on switch (123) of the flyback. P-Channel Switch (126) in the flyback is automatically turned on and voltage is applied across the winding (122). Reset is accomplished by diode (120) and winding (121) which puts current into the neutral node from common. Current starts to flow into neutral that is larger than the load current which is small due to power factor being maintained (a small input voltage requires a small average input current). As long as the flyback is started when the input voltages are small enough the power requirements are kept small and neutral will lift enough above the common so that the phase does not touch common through Zero crossing. Once phase is negative compared with neutral the average input current in the converter should reverse and start to help in charging all the capacitors attached to the neutral and phase side to transition the neutral side towards the upper rail. Once the neutral side is on its way up the flyback converter can be turned off.

The situation occurs again in the opposite polarity when neutral is clamped to the positive rail Vout+ and phase is heading towards Vout+. In this case when phase is a small voltage away from Vout+switch (117) is turned off and the flyback converter is started again. This time with the n-channel switch (125) and p-channel switch (124) switching in the primary of the flyback (122) with diode (119) and winding (121) providing negative current into the neutral node which starts to lower the voltage away from the positive rail Vout+. Once the polarity reverses and the current starts to flow out of neutral line into the phase line, the voltage on the neutral node will head towards Zero. At this point the flyback converter can be turned off. Using a small converter configured with small high voltage diodes (118) and (117) is a better alternative than a large siZe converter for the neutral side. The amount of power is dependent on where the flyback is started but it is also dependent if reactive current is needed to compensate for reactive currents in the capacitive elements. If this type of power factor correction is needed a larger flyback is needed for this current demand since the Zero current crossing determines where to start the converter and may occur at a higher voltage across the AC line. Other converter topologies could be used to accomplish the same separation needed on the neutral line. The implementation shown was the simplest method found.

Soft Switching Using Current Injection

Figure 21:
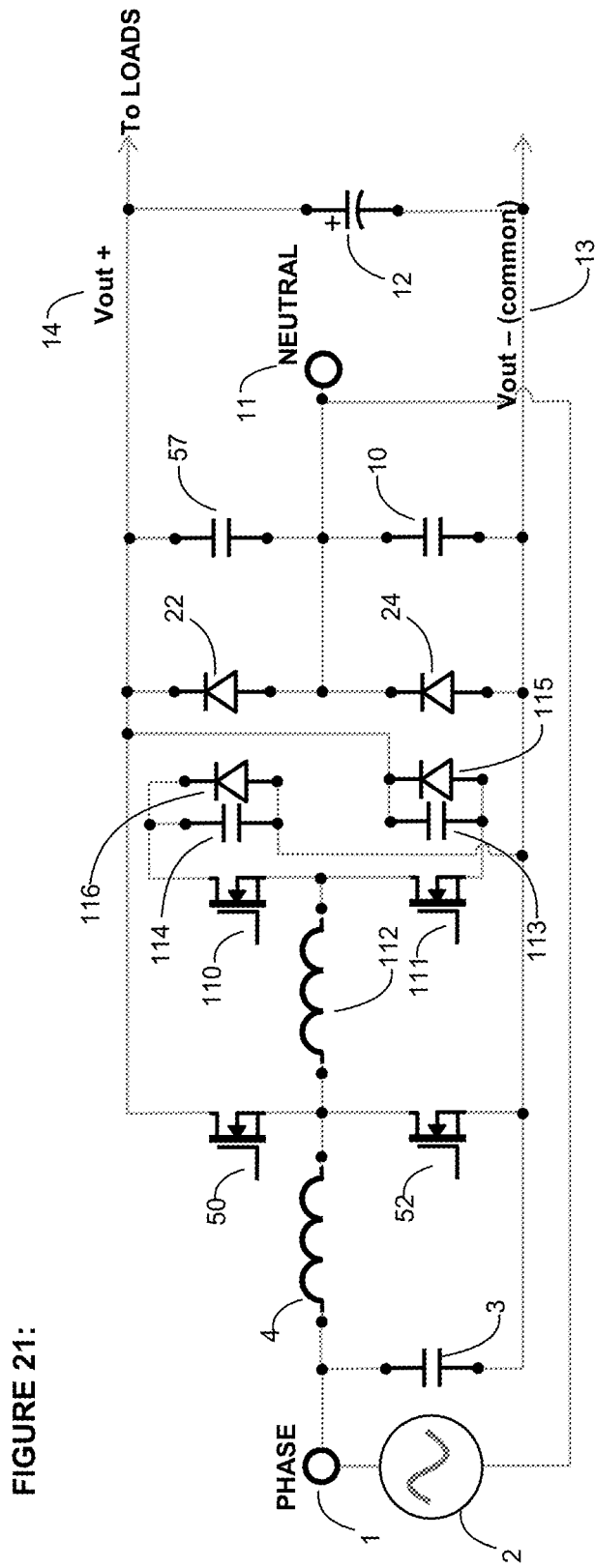
FIG. 21 shows a current injection method for a bridgeless PFC circuit.

An alternative method, instead of having ideal switches, in a continuous mode bridgeless PFC converter is by current injection into the node at the time that a transition is needed. In a bridgeless PFC converter running in critical mode as described before, the current for the transition is developed in the existing input choke. Instead if the current in the input choke does not reverse direction, another circuit is needed to inject current into this node so that the current is in the opposite direction of in-coming current in the choke. This method of current injection is presented in patent application "Method and Apparatus for Obtaining Soft Switching in all Switching Elements through Current Shaping and Intelligent Control", provisional application Ser. No. 62/133,245 and "Soft Switching on all switching elements Converter through Current Shaping" U.S. application Ser. No. 14/796, 204 Provisional application 62/133,245 and U.S. application Ser. No. 14/796,204 are incorporated by reference herein). Shown in FIG. 21 is a bridgeless PFC converter with the additional circuit to provide the extra current needed for soft transition. Depending on polarity, the current needs to be positive or negative into the node formed by the source of MOSFET (50) and the drain of MOSFET (52). When the phase line (1) is positive compared to neutral (11) input current is positive in choke (4) (towards the switch node). When the bottom switch (52) turns off the current from the input line charges the parasitic capacitance of the bottom switch (52) and discharges the capacitance of the top switch (50). This transition is soft without any extra current. When the upper switch (50) turns off the choke current is still in the same direction if the converter is running in continuous mode. This current forces the body diode of the upper switch to conduct. The switch node does not naturally move towards ground. When the bottom switch turns on the current is abruptly steered in the bottom switch which creates reverse recovery losses. To prevent this, the current in the upper switch must change polarity before the upper switch turns off. So right before the upper switch is about to be turned off, switch (111) is turned on. This ramps current in choke (112) and flows into capacitor (113). At this point in time capacitor is at common potential. It starts to charge towards Vout+. When the current in choke (112) is greater than the current in choke (4), the upper switch in now turned off. Because now the current in choke (112) is greater than choke (4) the switching node voltage starts to fall towards common. When the switching node reaches common the bottom switch (52) is turned on. This transition is now soft or has Zero voltage switching. The capacitor (113) charges to Vout. Any excess energy is put into the output through diode (116). When the current in choke (112) reaches Zero the current reverses and starts a resonant transition with capacitor (113). This capacitor is charge back to a voltage below common. When the current in the choke again is Zero, switch (111) is turned off. The cycle restarts again when the upper switch is going to be turned off.

When the line is in the opposite polarity, the other current injection circuit is operated so that current is put into the switching node. The components of this circuit are switch (110), capacitor (114), and diode (116). Operation of this circuit is the same as the previous circuit except this circuit is operated before the turn off of the bottom switch (52). Right before switch (52) is turned off the current if flowing from its source to its drain through inductor (4) towards phase (1). The switch (110) turns on and builds current in choke (112). The energy to ramp up the current in the choke (112) comes from capacitor (114) which is charged to a voltage above Vout+ (14). When the current in choke (112) is greater than choke (4) the bottom switch is turned off. The excess current is used to charge the parasitic capacitance of switch (52) and discharge the capacitance of switch (50). Again this is a soft transition. When the voltage on the drain of switch (52) reaches Vout+ (14) switch (50) is turned on. The capacitor (114) continues to supply current to the node while its voltage is falling. Its voltage is clamped to common with diode (116). At that point the energy stored in choke (112) is delivered to Vout+ (14). The current reaches Zero and reverses in choke (112) and ring back into capacitor (114). Capacitor is charged back up to voltage above Vout+ and at the moment the current in choke (112) reaches Zero again switch (110) is turned off. The circuit then waits again for the point before switch (52) is turned offagain.

Inverter Operation

All the methods mentioned above are used for power factor correction supplies. But the topology in FIG. 22 can be reversed to create an inverter (a DC to AC converter) since switches (117) and (118) can be timed to coincide with polarity desired in an alternating current line. The control method for the current in the choke is the same except that the average current desired is in the opposite direction. For grid tied inverters the circuit shown in FIG. 23 is adequate to produce a current that is low in total harmonic distortion. If the ability for large reactive currents is desired then the circuit of FIG. 24 can be used in which both phase and neutral are controlled by a high frequency switching half bridge followed by a choke. The converter will then be composed of two converters. One that controls the phase voltage and one that controls the neutral voltage.

For grid tied inverters, there is one small complication when it comes to the circuit of FIG. 22 or FIG. 23. Since the average current is in the opposite direction the neutral side does not naturally swing after Zero crossing. The swing has to be done before Zero crossing. The timing of when to turn off switch (117) or switch (118) has to be calculated so that the neutral side transitions is close to the opposite rail by the time Zero crossing occurs. The small flyback converter in FIG. 23 can help in lifting the rail but it cannot move it all the way to the other side. Therefore only the output current can move the neutral to the other side and a calculation has to be done to minimiZe neutral side switching losses. If switch (117) or switch (118) is turned off too early, the neutral swings to the other rail before Zero crossing then the same type of problem of losing control of the high frequency side occurs. It is better to be slightly late and turn on the opposite switch close to the time that the neutral should have swung to the other rail or in other words near Zero voltage switching.

Figure 24:
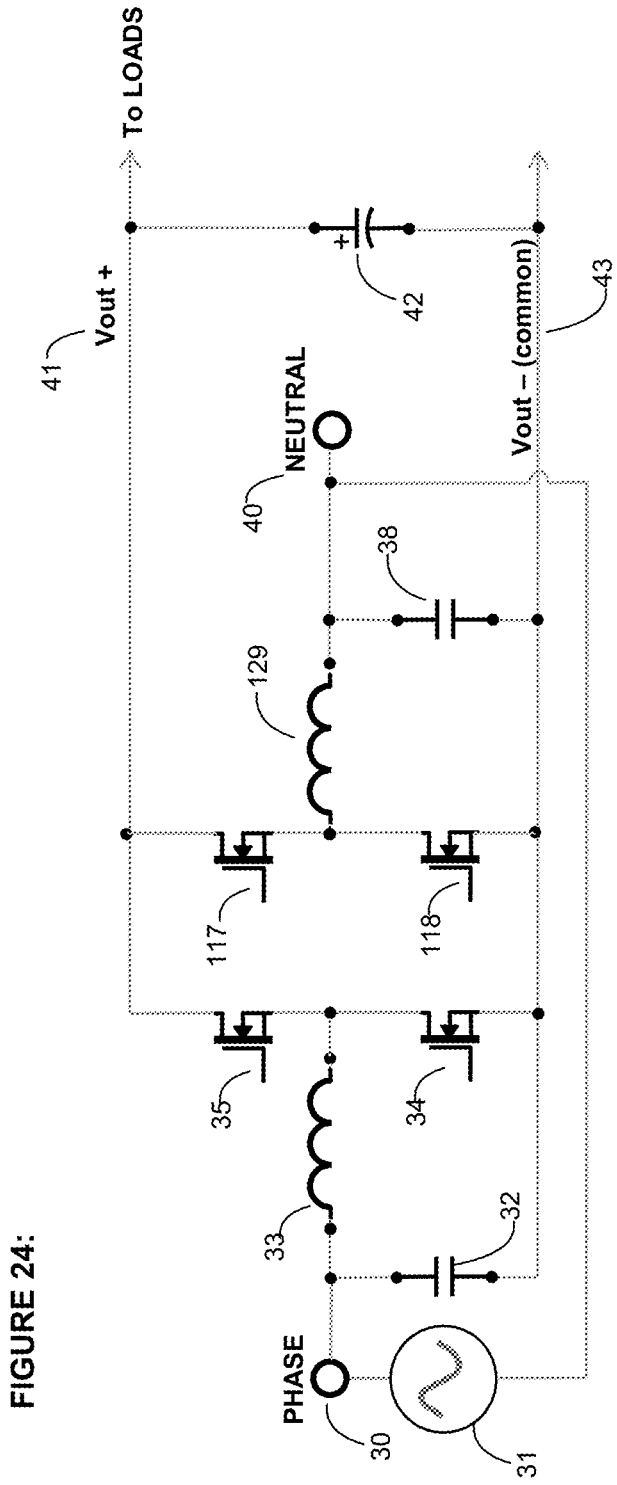
FIG. 24 shows a circuit for large reactive in which both phase and neutral are controlled by a high frequency switching half bridge followed by achoke.

The inverter that uses the topology of FIG. 24 does not have any of the problems mentioned above. The shape of voltage waveform on each side is arbitrary as long as the difference between the two sides produce the desired sinewave or follows the AC line in the case of the grid tied inverter. In order to minimiZe leakage current it is better to produce a sinewave with a DC component equal to half the bus voltage. The sinewave amplitude for each side would be half the output amplitude required and the two sides would be out of phase 180 degrees so that the difference between them produces the output sinewave desired. Each side works as an independent converter with a reference signal that is synchroniZed to each other to produce the desired sinewave.

Interleaving

Figure 25:
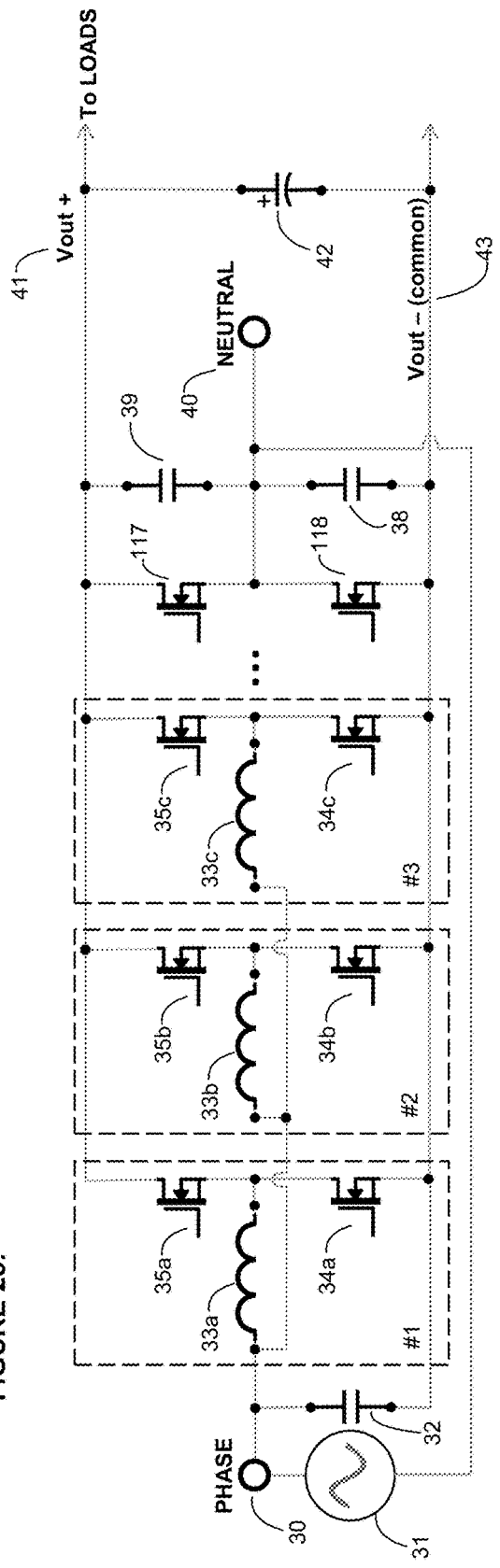
FIG. 25 shows benefits associated with interleaving the power stages.

Boundary mode operation creates triangular current signals that are approximately twice the height of the instantaneous average current which varies with a sinewave envelope. These triangular currents produce more EMI than a continuous mode current that has lower ripple. In order to reduce this large ripple current interleaving is used. Shown in FIG. 25 are benefits associated with interleaving the power stages. This is done by having multiple bridges with independent input chokes and switching them phase shifted from each other.

While this sounds simple it is actually quite complicated to interleave a variable frequency converter. Variations between each converter would make them drift apart and fixing them in master slave arrangement will not work because it is possible that the currents in each choke could "walk". The choke will "walk" when small changes in driving will slowly change the DC current level in each choke. When the DC current level in choke moves it will affect the Zero voltage switching characteristics and start to produce very large switching losses due to reverse recovery. Therefore each choke must have independent current monitoring.

Figure 27A:
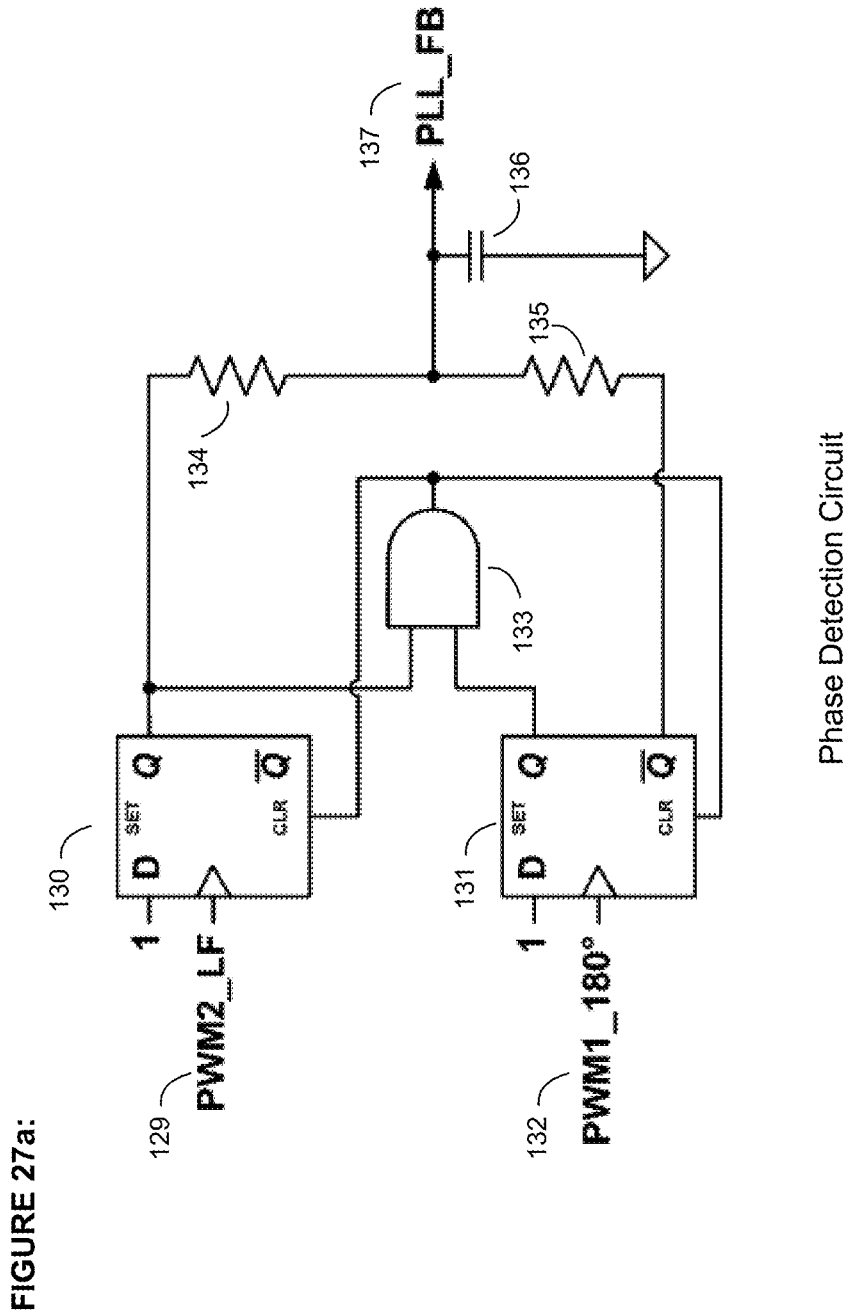
FIG. 27a is a phase detector, where the input to the detector is the one of PWM signals of a converter with the other input is a PWM signal is that is phase shifted 180 degrees from the other converter used as a guide signal.
Figure 27B:
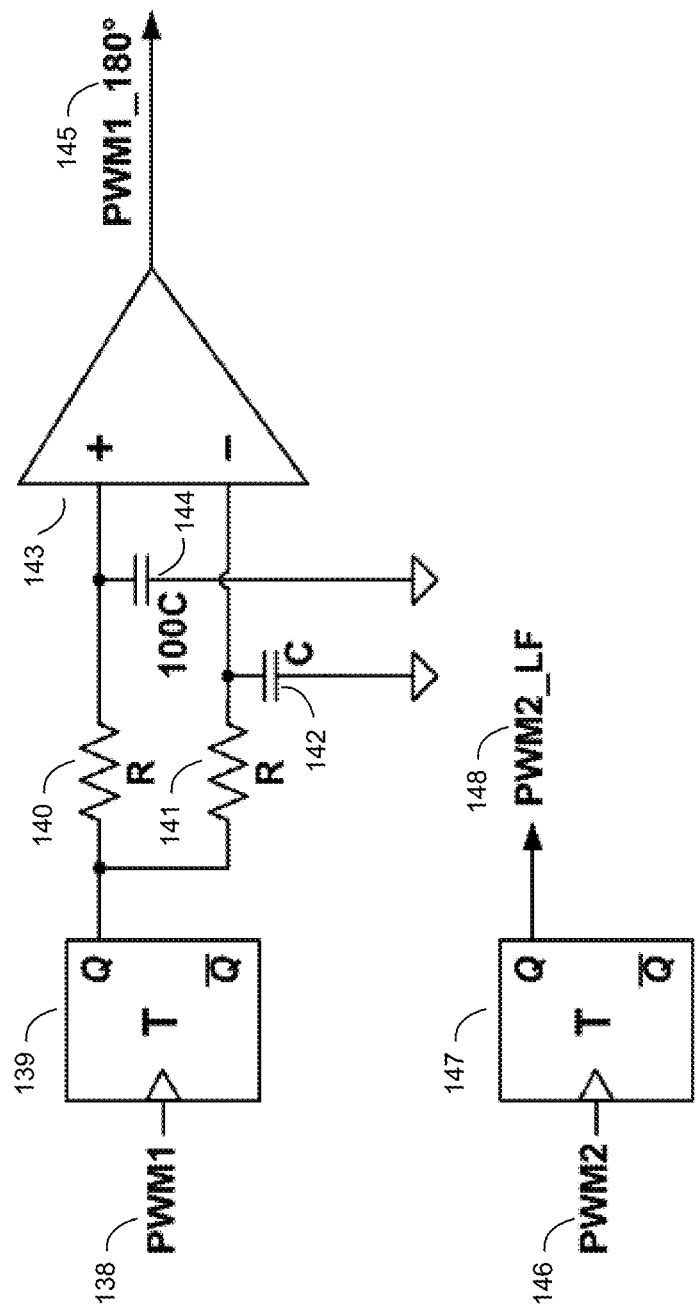
FIG. 27b shows an analog circuit with the reference signal shifted with 180 degree.

This patent presents two ways of correcting this problem. The first technique involves changing the ripple current in one or more of the converters in order to slow down that converter. The ripple calculated used in equations in FIG. 15 can be modified before being added to the average current. For example, in the case there are two interleaved converters the ripple current in the one that is slower is not modified, the one that is faster the ripple current is increased before the addition and subtraction is implemented to calculate the upper and lower thresholds. Increasing the ripple current in one converter will produce more conduction losses but will not impact the ZVS characteristics. An interleaving loop can be implemented in which the sign of the loop determines which of the converters to slow down and the amplitude of the value of the output of the loop determines how much to increase the ripple in that converter. A circuit that detects the interleaving level would be needed such as a phase detector. Shown in FIG. 27a is a phase detector implemented for this purpose. The input to the detector is the one of PWM signals of a converter with the other input is a PWM signal is that is phase shifted 180 degrees from the other converter used as a guide signal. The circuit produces a voltage that is in the middle when interleaving is achieved and produces a high or low signal when one converter or the other needs to be slowed down. The reference signal shifted with 180 degree could be obtain using the analog circuit presented in FIG. 27b. This consist into a comparator (143) which use an RC time constant (140, 144) that is larger than the other RC time constant (142,141) to create the delay of 180 degrees at the original switching frequency.

The second method involves using a digital controller to calculate the desired on time for the top switch and the on time for the bottom switch for the expected ripple current at a particular input voltage, output voltage, and input current. The period is then calculated from the sum of both times. Then the controller can setup each complementary PWM set to achieve the total period and phase shift based on that period. Even though this would achieve perfect interleaving it would produce the problem mentioned above in walking the chokes. This will be corrected by monitoring the average current in each choke and slightly changing the balance between the on time of the top switch and the on time of the bottom switch while not affecting the period. Each converter will balance its own current. Since changing the balance will affect the ripple current slightly, the ripple current would have to have some extra margin built in that would have some room for the maximum adjustment (duty cycle change) allowed. The advantage of this method is that multiple converters with multiple phases can be more easily interleaved since only the average current is monitored for each. The disadvantage is that the response time could be too slow to prevent some amount of reverse recovery situations during transient conditions so fast response is needed on the current monitoring loop. This method is more promising by the fact that more converters can be controlled in larger power systems. It is also dependent on the timing when the PWM periods are updated so that all PWMs have the same sum of all the periods combined so that timing between the modules is maintained. This also affects the phase shifts between modules and those times will be adjusted and create some duty cycle imbalances when periods are updated that must be compensated as part of the duty cycle balancing algorithm. For example, let's assume that there 3 converters that are interleaved and have a period of 3000 counts (each count equal to 1 ns). Then the phase shift between each converter is 1000 counts. Then a change occurs that the controller needs to increase the period 12 more counts. So the period will become for all 3 converters 3012 but they are still phase shifted 1000 counts apart and the correct phase shift should be 1004 counts. The first delayed converter has to delay an extra 4 counts, is this added to the on time of the top switch or bottom switch? If the top switch turns on first then the 4 counts will be added to the bottom switch which would unbalance this converter therefore the duty cycle balancer would have to increase the on time of the top switch to compensate for this change. The problem is doubled for the last delayed converter in that it has to phase shift 8 counts.

Capacitance Reduction in the Inductor

Using GaN switches allows the converter to increase the operating frequency since they have relatively low gate and drain charge. Increasing the frequency allows the input choke to become smaller and cost less. But increasing the switching frequency puts some constraints on the choke design. MinimiZation of the intra-winding capacitance becomes a priority for losses and also for noise. Shown in FIG. 17 is a proposed inductor design that reduces the parasitic capacitance. The idea is to split the choke into smaller pieces that have less area between each winding. Then by stacking the windings the capacitance is reduced since the parasitic capacitance is in series. By separating into multiple legs the number of effective layer of windings go up and smaller capacitors are in series. This concept of using multi-legs magnetic structure is described in the patent application "Magnetic Structure for Low Leakage Inductance and Very High Efficiency", U.S. application Ser. No. 14/660,901 (A copy of U.S. application Ser. No. 14/660,901 is exhibit A hereto and that application is incorporated by reference herein).

For example, if we have a single turn for the inductor with area A and when this same inductor is designed in a 4 legged magnetic each winding area is reduced by 4 with ½ the width for each winding and ½ the circumference this would require a 2 turns on one of the leg to equal the old inductance. But instead the 2 turns are stacked on the same leg so now the original capacitance is reduced by 8 times for the singleturn.

Figure 18:
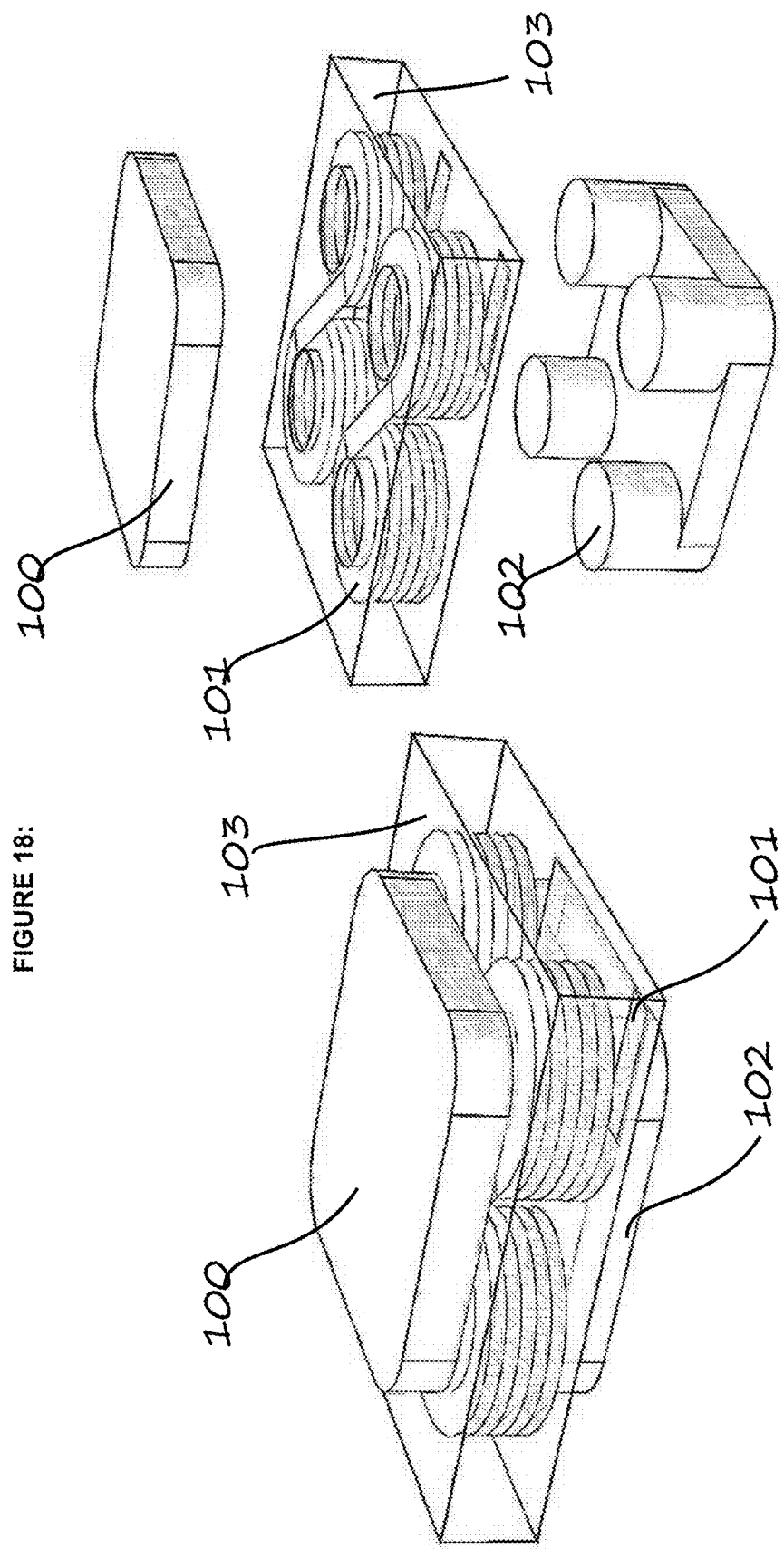
FIG. 18 shows how this winding can be formed or a printed wiring board (103) to create this winding shape.

Shown in FIG. 17 is a 4 legged choke constructed with cores (102) and (100) and winding (101). This winding can be formed or a printed wiring board (103) shown in FIG. 18 can be used to create this winding shape.

Figure 19:
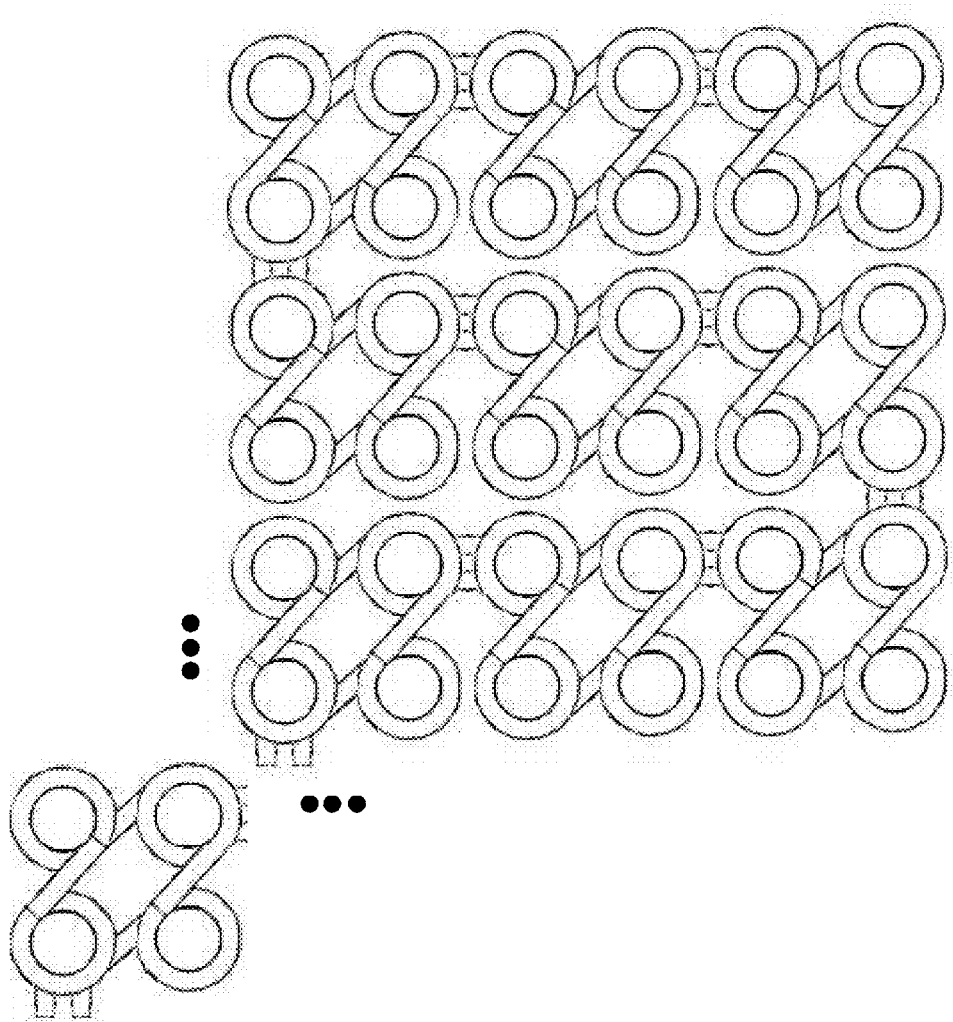
FIG. 19 shows how this can be expanded further into more legs to reduce the capacitance.
Figure 20:
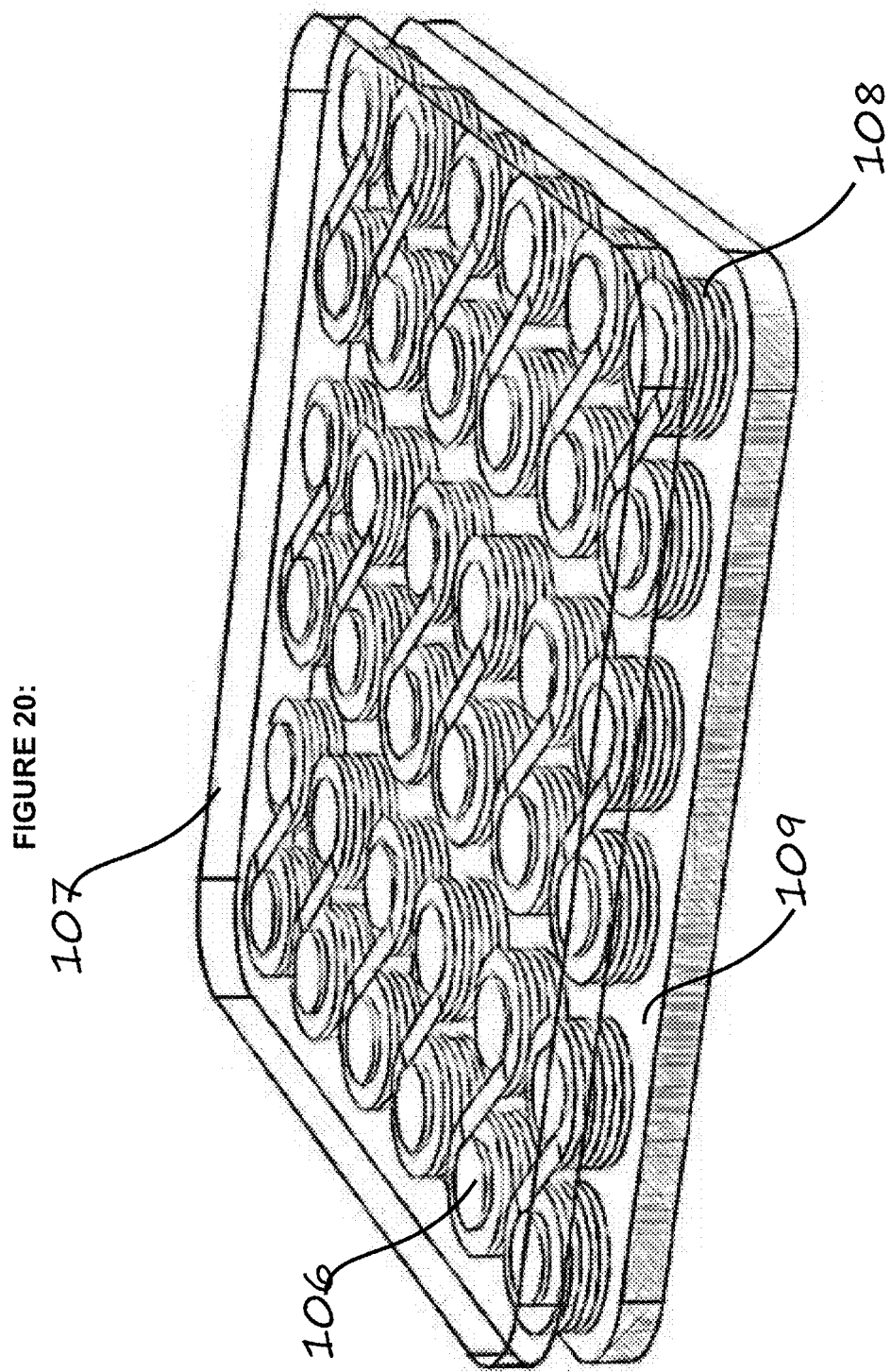
FIG. 20 shows a pattern to expand to multiple legs with winding (108) with core plates (109) and (107)

This can be expanded further into more legs to reduce the capacitance further shown in FIG. 19. One pattern to expand to multiple legs is show in this figure. A similar pattern is shown in FIG. 20 with winding (108) with core plates (109) and (107). The core cylinders (106) can be a single piece used multiple times for all the posts. An added benefit of this structure is that the magnetic field forms smaller spaced apart dipoles of north and south. As more are added the stray magnetic field at a distance is reduced by the number of dipoles in the original structure. This is caused by each magnetic polarity canceling the one next to it at a distance greater than the spacing between dipoles.

PFC CCrM Inductor Air Gap Improvement

Figure 28:
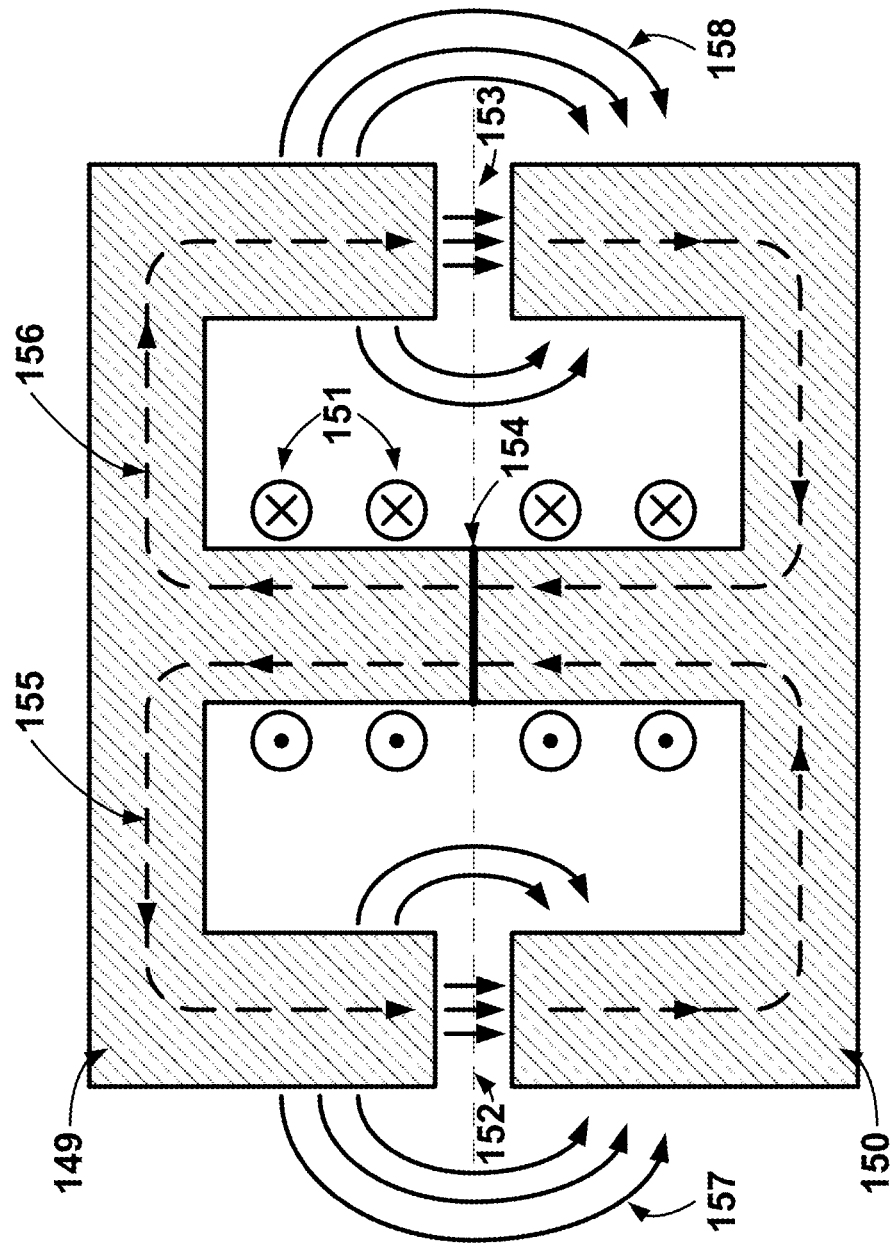
FIG. 28 shows a magnetic core that consists of two identical "E" core shapes 149 and 150 with outside leg gaps 152 and 153 and bonded together with no gap in the middle leg 154.

The PFC or inverter inductor must have an air gap to store energy. The flux created by the high electrical current=Ineg+Iripple for CCrM requires storing this energy. FIG. 28 shows a magnetic core that consists of two identical "E" core shapes 149 and 150 with outside leg gaps 152 and 153 and bonded together with no gap in the middle leg 154. The internal windings 151 will carry electrical current and this current will create the magnetic fields 155 & 156. The External gaps 152 and 153 will pass the same B field 155 and 156 into the gaps 152 and 153 but will create a high H magnetic field since the permeability of air is much less than that of the core material and will produce relatively spread out external fields 157 and 158 which could cause differential mode noise through magnetic coupling into other circuits. They also cause losses in the winding themselves; since the flux lines cut into the copper wire and produce eddy current losses. The intensity of these fields diminishes with distance and the spread is proportional to the siZe of the gap.

Figure 29:
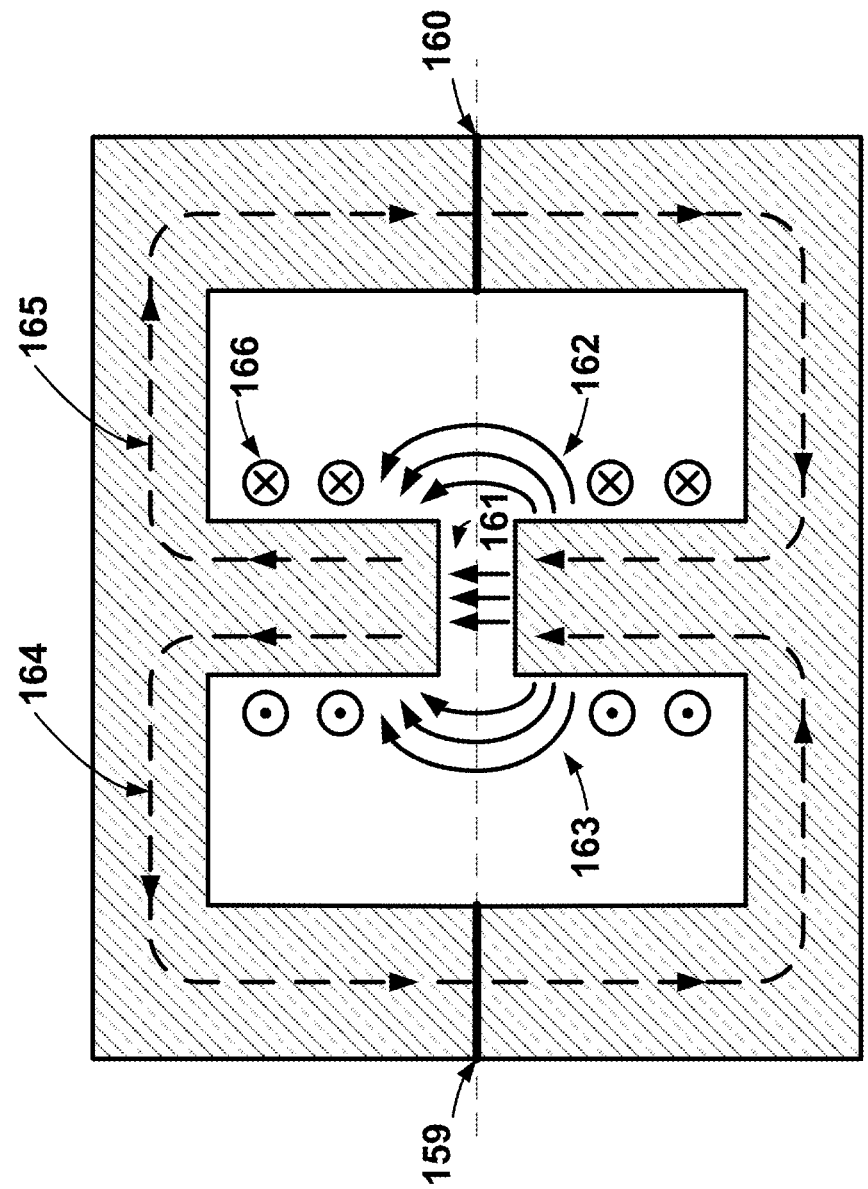
FIG. 29 presents the two "E" cores with internal gap (161)

FIG. 29 presents the two "E" cores with internal gap (161). The external legs are bonded (159, 160) so the magnetic path (164, 165) has lower reluctance on the external legs. The magnetic flux 163 and 162 is still spread out inside the core and still cause losses in the winding but will cause less problems in external circuits.

Figure 30:
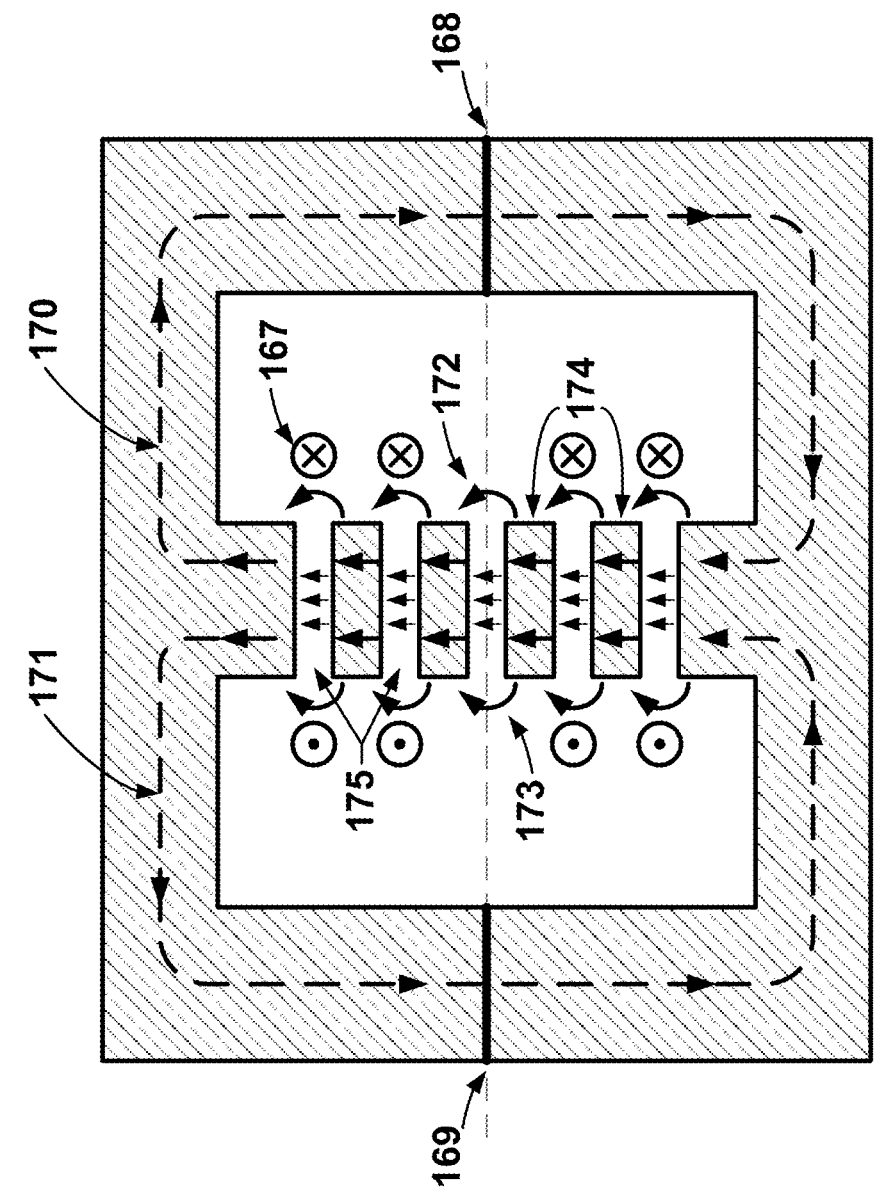
FIG. 30 presents the two "E" cores with the internal air gap (175) split into multiple gaps by using multiple pieces of magnetic material (174).

FIG. 30 presents the two "E" cores with the internal air gap (175) split into multiple gaps by using multiple pieces of magnetic material (174). The small dimensions of the gaps insure that the magnetic fields do not spread out as much. If the gap siZe is kept lower than 4 times the distance to winding, most of the field will pass below the windings and not in the copper and will produce no eddy current losses. The total gap remains the same but each gap produces less spread and more of the winding area inside can be utiliZed by copper reducing the conduction losses of the winding that is designed.

Figure 26:
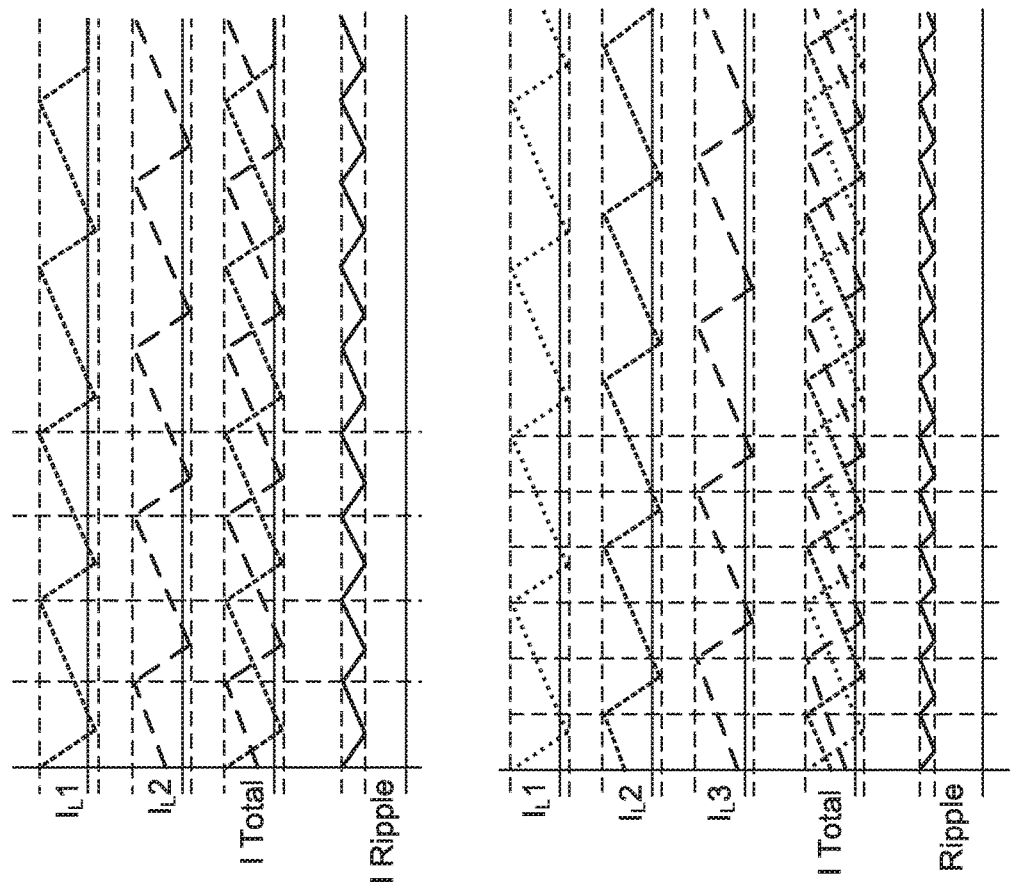
FIG. 26 shows some advantages of the present invention.

FIG. 26 shows some advantages of the present invention; Specifically, the CCrM converter with many phases presents some advantages compared with single phase converter:

The output current ripple has a lower value proportional with the number of interleaving phase. Ripple frequency is much higher (depending on number of phases used) so, it's much easier to filter the high frequency current. The current in each choke will be much lower The push back current has the same value for entire the current range, so the ZVS is not affected by the interleaving EMI filter input will be much smaller Flux swing in each choke will be much smaller because the current will be smaller in each choke From the foregoing description various new and useful aspects and elements of a PFC will become apparent to those in the art.

The invention claimed is:

1. A totem pole bridgeless power factor corrected (PFC) converter, comprising:
    a main inductor element,
    two main switching devices placed on top of each other with a common part connected to said main inductor element at a switching node,
    a first low frequency rectifier means having a cathode connected with a positive output voltage electrode Vout+ of the converter,
    a second low frequency rectifier means having a cathode connected with an anode of said first low frequency rectifier means and having an anode connected with a negative output voltage electrode Vout− of the converter, wherein said first and second low frequency rectifier means have a common connection, and
    two capacitors connected across each of said first and second low frequency rectifier means,
    wherein the common connection of the first and second low frequency rectifier means is connected to a neutral of the converter,
    wherein a terminal of the main inductor element that is not connected to the switching node is configured to be connected, in operation, to a phase of an AC source, and
    further comprising
    a bidirectional current injection circuit placed into the switching node, said current injection circuit configured to shape injection current, injected in the switching node, as a narrow current pulse with a first amplitude to obtain zero voltage switching conditions across each of the two main switching devices,
    wherein the first amplitude is larger than a second amplitude of a current passing through the two main switching elements prior to transition time.

2. The converter of claim 1, wherein said bidirectional current injection circuit comprises an additional inductor element that has a first terminal thereof placed to the switching node, and
further comprising
    two additional switching elements connected together to a second terminal of said additional inductor element,
    wherein each of the two additional switching elements is further connected, respectively, to a corresponding one of first and second capacitors,
    wherein the first capacitor is connected to the negative output voltage electrode Vout− and the second capacitor is connected to the positive output voltage electrode Vout+ of the bridgeless PFC converter,
    a first diode across the first capacitor, the first diode having an anode connected to the negative output voltage electrode Vout−;
    a second diode across the second capacitor, the second diode having a cathode connected to the positive output voltage electrode Vout+;
    wherein the bidirectional current injection circuit is configured to inject said injection current during a transition of voltage in the switching node to obtain zero voltage switching conditions across both of the main switching devices, said injection current having an amplitude that is larger than an amplitude of current flowing through the two main switching devices.

3. The converter of claim 1, further comprising:
    two auxiliary inductors coupled together at the switching node, a first of the two auxiliary inductors placed between the switching node and a first main switching element of the two main switching elements, a second of the two auxiliary inductors placed between the switching node and a second main switching element of the two main switching elements, and
    two additional rectifiers means,
    wherein a first additional rectifier means of the two additional rectifier means has a cathode that is connected to the positive output voltage electrode Vout+ and an anode connected to a point at which the second auxiliary inductor is connected to the second main switching element;

wherein a second additional rectifier means of the two additional rectifier means has an anode that is connected to the negative output voltage electrode Vout− and a cathode connected to a point at which the first auxiliary inductor is connected to the first main switching element.

4. The converter of claim 1, wherein a Schottky diode is placed in series with each of the two main switching elements to prevent conduction of the two main switching elements, and further comprising two additional rectifiers means, wherein a first of the two additional rectifier means has a cathode and is placed between the switching node and the positive output voltage electrode Vout+, with the cathode connected to the positive output voltage electrode Vout+, wherein a second of the two additional rectifier means has an anode and is placed between the switching node and the negative output voltage electrode Vout−, with the anode connected to the negative output voltage electrode Vout−.

5. A combination of circuits comprising a first converter of claim 1 and a second converter of claim 1 in parallel with one another and configured to operate in a critical conduction mode, wherein the first and second converters are interleaved, in operation, through variable frequency by changing ripple current in each of the first and second converters.

6. A combination of circuits comprising a first converter of claim 1 and a second converter of claim 1 in parallel with one another and configured to operate in a critical conduction mode, wherein the first and second converters are interleaved, in operation, by adjusting "on" time for the main switching elements.

7. A magnetic element configured as part of a totem pole bridgeless power factor correction (PFC) converter, the magnetic element comprising:

an internal winding formed by multiple windings connected together in series, each of said multiple windings being placed on a leg of multiple-leg magnetic structure that has an even number of legs, wherein polarities of the multiple windings are defined in a such way that magnetic fields produced by adjacent windings from said multiple windings have opposite polarities.

8. The magnetic element of claim 7, wherein the multiple windings are embedded in a multilayer PCB structure.

9. The magnetic element of claim 7, wherein the multiple windings are formed by Litz wire.

10. The magnetic element of claim 7, wherein the multiple windings are formed by magnetic wire.

11. The magnetic element of claim 7, wherein the multiple windings are formed by Litz wire, and further comprising additional windings formed by Litz wire and coupled with said internal winding, the additional windings being embedded in a multilayer PCB.

12. The magnetic element of claim 7, wherein a multiple-leg magnetic structure contains a leg having multiple gaps along a length thereof, said multiple gaps separated by pieces of magnetic material.

* * * * *